(12) United States Patent
Guo et al.

(10) Patent No.: US 11,903,016 B2
(45) Date of Patent: *Feb. 13, 2024

(54) ELECTRONIC DEVICES AND METHOD FOR USE IN RESOURCE MANAGEMENT DEVICES, DATABASES AND OBJECTS

(71) Applicant: Sony Group Corporation, Tokyo (JP)

(72) Inventors: Xin Guo, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,151

(22) Filed: Jan. 18, 2023

(65) Prior Publication Data
US 2023/0156773 A1    May 18, 2023

Related U.S. Application Data

(63) Continuation of application No. 17/144,167, filed on Jan. 8, 2021, now Pat. No. 11,589,367, which is a
(Continued)

(30) Foreign Application Priority Data

Nov. 3, 2016   (CN) .......................... 201610973538.X

(51) Int. Cl.
*H04W 72/56*      (2023.01)
*G06F 16/25*       (2019.01)
(Continued)

(52) U.S. Cl.
CPC ............ *H04W 72/56* (2023.01); *G06F 16/00* (2019.01); *G06F 16/252* (2019.01);
(Continued)

(58) Field of Classification Search
CPC ..... H04W 72/10; H04W 24/08; H04W 72/04; H04W 72/08; H04W 72/0446; H04W 72/0453; G06F 16/00; G06F 16/252
See application file for complete search history.

(56) References Cited

U.S. PATENT DOCUMENTS

| 8,514,788 | B2 * | 8/2013 | Fujita | H04W 72/044 |
| | | | | 370/329 |
| 10,009,876 | B2 * | 6/2018 | Huschke | H04W 28/0864 |

(Continued)

FOREIGN PATENT DOCUMENTS

| CN | 101023646 A | 8/2007 |
| CN | 102843696 A | 12/2012 |

(Continued)

OTHER PUBLICATIONS

International Search Report and Written Opinion dated Nov. 29, 2017 for PCT/CN2017/103303 filed on Sep. 26, 2017, 10 pages including translation of the International Search Report.

*Primary Examiner* — Michael J Moore, Jr.
(74) *Attorney, Agent, or Firm* — XSENSUS LLP

(57) ABSTRACT

Disclosed in the present disclosure are an electronic device and method for use in a resource management device, an electronic device and method for use in a resource management database, and an electronic device and method for use in a resource management object. The electronic device for use in a resource management device comprises a processing circuit, which is configured to: determine a resource usage behavior pattern of a resource management object within a specific time range and a specific space range; allocate a wireless resource to the resource management object according to the resource usage behavior pattern.

12 Claims, 16 Drawing Sheets

Related U.S. Application Data continuation of application No. 16/345,725, filed as application No. PCT/CN2017/103303 on Sep. 26, 2017, now Pat. No. 10,925,074.

(51) Int. Cl.
  *H04W 24/08* (2009.01)
  *H04W 72/04* (2023.01)
  *G06F 16/00* (2019.01)
  *H04W 72/54* (2023.01)
  *H04W 72/0446* (2023.01)
  *H04W 72/0453* (2023.01)

(52) U.S. Cl.
  CPC ........... *H04W 24/08* (2013.01); *H04W 72/04* (2013.01); *H04W 72/54* (2023.01); *H04W 72/0446* (2013.01); *H04W 72/0453* (2013.01)

(56) References Cited

U.S. PATENT DOCUMENTS

| | | | | |
|---|---|---|---|---|
| 10,044,438 | B2* | 8/2018 | Kadous | H04B 7/2643 |
| 10,218,589 | B1* | 2/2019 | Matthews | H04L 43/0817 |
| 10,925,074 | B2* | 2/2021 | Guo | G06F 16/00 |
| 11,589,367 | B2* | 2/2023 | Guo | H04W 24/02 |
| 2002/0087675 | A1 | 7/2002 | Yoshii et al. | |
| 2004/0185860 | A1* | 9/2004 | Marjelund | H04L 47/826 |
| | | | | 455/450 |
| 2005/0183143 | A1* | 8/2005 | Anderholm | G06F 11/3438 |
| | | | | 726/22 |
| 2006/0140115 | A1* | 6/2006 | Timus | H04L 47/10 |
| | | | | 370/252 |
| 2008/0090583 | A1* | 4/2008 | Wang | H04W 72/121 |
| | | | | 714/751 |
| 2009/0144421 | A1* | 6/2009 | Bunch | H04L 67/535 |
| | | | | 709/224 |
| 2009/0291692 | A1* | 11/2009 | Kazmi | H04B 17/327 |
| | | | | 455/452.2 |
| 2012/0170552 | A1* | 7/2012 | Oprescu-Surcobe | |
| | | | | H04W 28/16 |
| | | | | 370/332 |
| 2012/0244873 | A1* | 9/2012 | Capdevielle | H04W 28/26 |
| | | | | 455/452.2 |
| 2013/0301446 | A1* | 11/2013 | Chen | H04W 72/21 |
| | | | | 370/252 |
| 2013/0337800 | A1* | 12/2013 | Gormley | H04W 36/0061 |
| | | | | 455/423 |
| 2014/0200016 | A1* | 7/2014 | Siomina | H04W 28/20 |
| | | | | 455/450 |
| 2015/0055517 | A1* | 2/2015 | Samdanis | H04W 72/52 |
| | | | | 370/280 |
| 2015/0208410 | A1* | 7/2015 | Koutsimanis | H04W 72/27 |
| | | | | 370/252 |
| 2015/0215903 | A1* | 7/2015 | Zhao | H04W 72/02 |
| | | | | 370/329 |
| 2015/0230286 | A1* | 8/2015 | Feuersaenger | H04W 72/1215 |
| | | | | 370/252 |
| 2016/0006500 | A1* | 1/2016 | Radpour | H04B 7/18539 |
| | | | | 455/427 |
| 2016/0037399 | A1* | 2/2016 | Li | H04W 36/0016 |
| | | | | 455/436 |
| 2016/0261615 | A1* | 9/2016 | Sonnenberg | H04L 41/12 |
| 2017/0230982 | A1* | 8/2017 | Varghese | H04L 41/0816 |
| 2017/0245166 | A1* | 8/2017 | Bienas | H04W 76/14 |
| 2017/0353960 | A1* | 12/2017 | Heninwolf | H04W 72/23 |
| 2019/0021117 | A1* | 1/2019 | Zhou | H04W 4/70 |
| 2019/0268916 | A1* | 8/2019 | Guo | H04W 16/14 |
| 2019/0357057 | A1* | 11/2019 | Cirkic | H04B 17/382 |

FOREIGN PATENT DOCUMENTS

| | | |
|---|---|---|
| CN | 104618915 A | 5/2015 |
| CN | 104811943 A1 | 7/2015 |
| WO | 2016/051294 A1 | 4/2016 |

\* cited by examiner

|  | F1 | F2 | F3 | ... | Fn |
|---|---|---|---|---|---|
| RMO1 | 1 | 3 | -1 |  | 4 |
| RMO2 | 1 | -1 | 2 |  | 4 |
| ⋮ |  |  |  |  |  |
| RMOm | -1 | 3 | 2 |  | 4 |

ELECTRONIC DEVICES AND METHOD FOR USE IN RESOURCE MANAGEMENT DEVICES, DATABASES AND OBJECTS

CROSS-REFERENCE TO RELATED APPLICATIONS

This application is a continuation of U.S. application Ser. No. 17/144,167, filed Jan. 8, 2021, which is a continuation of U.S. application Ser. No. 16/345,725, filed Apr. 29, 2019 (now U.S. Pat. No. 10,925,074), which is based on PCT filing PCT/CN2017/103303 filed Sep. 26, 2017, which claims the priority to Chinese patent application No. 201610973538.X, titled "ELECTRONIC DEVICES AND METHOD FOR USE IN RESOURCE MANAGEMENT DEVICES, DATABASES AND OBJECTS", filed with the China National Intellectual Property Administration (CNIPA) on Nov. 3, 2016, the entire contents of each are incorporated herein by reference.

FIELD OF THE DISCLOSURE

Embodiments of the present disclosure generally relate to the field of wireless communications, in particular to coexistence management of a multi-communication system, and more particularly to an electronic device and a method for a resource management apparatus, an electronic device and a method for a resource management database, and an electronic device and a method for a resource management object.

BACKGROUND OF THE DISCLOSURE

With the rapid development of computer and communication technologies, the global information network is rapidly evolving to the Next Generation Network (NGN) based on the Internet Protocol (IP). An important feature of the next generation network is the coexistence of multiple wireless technologies to form a heterogeneous radio access network. In the heterogeneous radio access network, there are differences in priorities among different systems in terms of the use of spectrum resources. For example, a network operating in a television band includes a primary system and a secondary system. The primary system has the license right to use the operation frequency band, and the secondary system does not have the license right to use the frequency band. The secondary system can use the licensed spectrum together with the primary system when and only when the interferences to the intra-frequency primary system are within an allowable range. Further, the secondary systems may be set with multiple priority levels.

When allocating resources for a target system in the heterogeneous radio access network, two factors are primarily considered. Firstly, a high priority level system should be protected. That is, the resource utilization right of the high priority level system should be ensured not to be impaired. In other words, the interferences to the high priority level system should be ensured to be within the allowable range. The high priority level system includes a primary system or a system among the secondary systems that has a higher priority level than the target system. Secondly, if the system in the priority level of the target system needs to meet the Quality of Service (QoS), interference control between systems in this priority level should further be considered.

SUMMARY OF THE DISCLOSURE

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic device for a resource management apparatus is provided. The electronic device includes processing circuitry. The processing circuitry is configured to: determine resource utilization behavior patterns of resource management objects within a specific time range and a specific space range; and allocate wireless resources for the resource management objects according to the resource utilization behavior patterns.

According to another aspect of the present disclosure, a method for a resource management apparatus is provided. The method includes: determining resource utilization behavior patterns of resource management objects within a specific time range and a specific space range; and allocating wireless resources for the resource management objects according to the resource utilization behavior patterns.

According to an aspect of the present disclosure, an electronic device for a resource management database is provided. The electronic device includes processing circuitry and a storage. The processing circuitry is configured to acquire information relevant to resource utilization behavior patterns of resource management objects. The storage is configured to store the resource management objects in association with the information.

According to another aspect of the present disclosure, a method for a resource management database is provided. The method includes: acquiring information relevant to resource utilization behavior patterns of resource management objects; and storing the resource management objects in association with the information.

According to an aspect of the present disclosure, an electronic device for a resource management object is provided. The electronic device includes processing circuitry. The processing circuitry is configured to: measure, based on a measurement request from a resource management apparatus, a resource utilization behavior pattern; and generate, based on a result of the measuring, a measurement response to the measurement request.

According to another aspect of the present disclosure, a method for a resource management object is provided. The method includes: measuring, based on a measurement request from a resource management apparatus, a resource utilization behavior pattern; and generating, based on a result of the measuring, a measurement response to the measurement request.

According to other aspects of the present disclosure, there are further provided computer program codes and a computer program product for methods of electronic devices, and a computer readable storage medium having the computer program code for implementing the methods recorded thereon.

With the electronic devices and the methods according to embodiments of the present disclosure, allocation of wireless resources is performed based on resource utilization behavior patterns of resource management objects, which can optimize allocation of the wireless resources, for example, extend utilization duration that the resource management object can use the resource, and reduce consumption due to system reconfiguration, thereby improving resource utilization efficiency.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
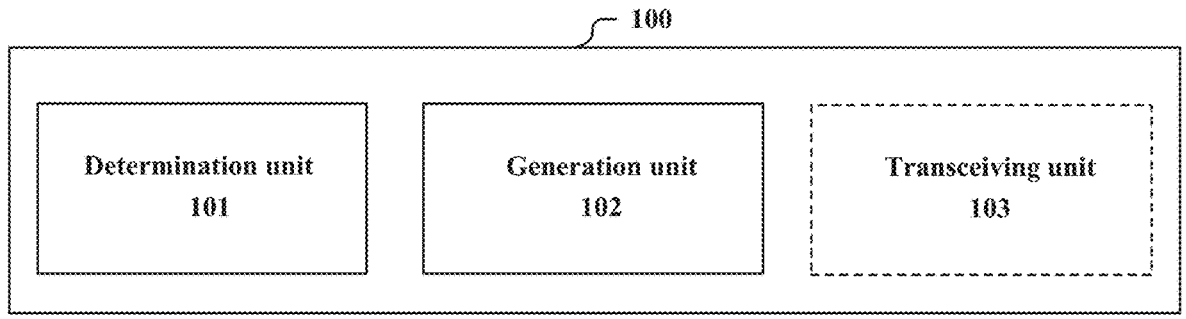
FIG. 1 is a functional block diagram showing an electronic device for a resource management apparatus according to an embodiment of the present disclosure.

FIG. 1 is a functional block diagram showing an electronic device 100 for a resource management apparatus according to an embodiment of the present disclosure. As shown in FIG. 1, the electronic device 100 includes a determination unit 101, and a generation unit 101. The determination unit 101 is configured to determine a resource management object of which resource utilization behavior pattern information within a specific space range and a specific time range is to be measured. The generation unit 101 is configured to generate a measurement request, to instruct the resource management object to measure the resource utilization behavior pattern information.

The determination unit 101 and the generation unit 102 may be implemented, for example, by one or more processing circuitries. The processing circuitry may be implemented, for example, as a chip. The electronic device 100 may be arranged in the resource management apparatus or may be communicatively connected to the resource management apparatus.

The resource management object is, for example, a wireless communication system to use wireless resources, and the wireless communication system may be fixed or mobile. The wireless communication system described herein may be a communication system including a network control terminal such as a base station and a network node such as user equipment. As mentioned above, in a heterogeneous radio access network, various factors need to be considered when performing resource allocation among multiple communication systems. For example, a resource management apparatus may be provided to manage utilization of resources. The resource management apparatus can coordinate the common use of wireless resources by the wireless communication systems.

The wireless resources may include at least one of: frequency domain resources, time domain resources, code domain resources, resources involved in some new wireless technologies, such as a codebook in a sparse code multiple-access system or an interleaver in an interleaved multiple-access system. For ease of description, spectrum resources are taken as an example of wireless resources hereafter. In this case, the measurement request generated by the electronic device 100 is used to measure spectrum resource utilization behavior pattern information. It should be understood that this is not limitative, and embodiments of the present disclosure are similarly applicable to other types of wireless resources.

In an example, the resource utilization behavior pattern is a distribution of resource utilization events of the resource management object within the specific time range and/or the specific space range. In an example, the resource utilization behavior pattern is a distribution of utilization behaviors and utilization results of the resource management object with respect to the wireless resources in time and space. In the case that the wireless resources are spectrum resources, the utilization behaviors may include, for example, utilization, sensing, calculation and learning of the spectrum, querying a database, and switching between behaviors. The utilization of the spectrum is described below as an example of the utilization behavior, but it should be understood that this is not limitative, and the description is similarly applicable to other utilization behaviors.

Exemplarily, the resource utilization behavior pattern may include a distribution of duration when the resource management object utilizes the wireless resources to perform data transmission within the specific time range and the specific space range.

In other examples, the resource utilization behavior pattern may further include the number of events that the resource management object utilizes the wireless resources within the specific time range and the specific space range or a distribution of intervals between two adjacent events, where the events may include attempting to perform utilization, transmission succeeding, or transmission failing. Transmission succeeding, for example, refers to a case that a certain resource management object or a certain group of resource management objects performs transmission on the wireless resources while meeting a required QoS and the transmission duration exceeds a certain threshold, otherwise the transmission fails. In a case that an actual packet error rate of the resource management object is lower than a required packet error rate, it is considered that the required QoS is met.

More specifically, the above mentioned event of attempting to perform utilization, event of transmission succeeding and event of transmission failing are respectively recorded as $\mathcal{U}$, $\mathcal{S}$ and $\mathcal{F}$, and random variables $N_{\mathcal{U}}$, $N_{\mathcal{S}}$ and $N_{\mathcal{F}}$ are defined to respectively indicate the number of occurrences of the three events, random variables and $TI_{\mathcal{U}}$, $TI_{\mathcal{S}}$, $TI_{\mathcal{F}}$ are defined to respectively represent intervals between the three events, and random variables $TD_{\mathcal{U}}$, $TD_{\mathcal{S}}$ and $TD_{\mathcal{F}}$ are defined to respectively represent durations of the three events. In this case, the above distribution may be expressed as an average, a standard deviation, a joint variance, a probability, and a conditional probability of the above random variables within the specific time range and/or the specific space range.

Thus, the resource utilization behavior pattern information indicates a statistical measure for the utilization behaviors and the utilization results of the resource management object with respect to the wireless resources, providing simple and effective representation, measurement and calculation, and thereby improving resource efficiency.

The resource utilization behavior pattern information is obtained and reported by the resource management object. In this embodiment, the determination unit 101 determines a resource management object that is to measure the resource utilization behavior pattern information, and the generation unit 102 generates a corresponding measurement request. It should be noted that in some variations, the setting of the resource management object that is to perform measurement may be default. For example, all resource management objects managed by the resource management apparatus or resource management objects within a specific range may be set as the resource management objects to perform measurement. In this case, the determination unit 101 may not be required to perform the determination operation. In other words, the determination unit 101 in the electronic device 100 is optional. The determined resource management object performs measurement in response to the received measurement request to obtain the resource utilization behavior pattern information, and provides the resource utilization behavior pattern information as a measurement response to the resource management apparatus.

Correspondingly, as shown by a dashed line block in FIG. 1, the electronic device 100 further includes a transceiving unit 103, configured to: transmit the measurement request to the resource management object determined by the determination unit 101, and receive a measurement response containing a measurement result from the resource management object. The transceiving unit 103 may be implemented as a transceiver or transceiving circuitry. In an example, the resource management apparatus further updates a resource management database using the measurement response. Alternatively/additionally, the resource management object may report the measurement response directly to the resource management database.

The measurement request may include, for example, at least one of a measurement object, a measurement time window and a measurement region. Exemplarily, the measurement request may include the following parameters: a wireless resource range (or identification), a measurement object, a measurement time window, a measurement region, and the like. The wireless resource range or identification specifies wireless resources to be measured, such as a spectrum range to be measured. The measurement object is a parameter corresponding to a specific type of the resource utilization behavior pattern, such as each stochastic variable described above or the distribution thereof. The measurement time window is the above specific time range, for example, may include a window start time and a window end time, where the window start time may be any time without limitation. The measurement region is the above specific space range. It should be noted that each of the above parameters may have multiple values, correspondingly indicating that multiple times and/or multiple types of measurements are to be performed.

In addition, the measurement request may further include a parameter value field for storing the measurement result obtained after the measurement is completed. This field may be set to be a reference value or set to be empty when a measurement request is transmitted.

After the measurement is completed, the resource management object may generate a measurement response by containing the measurement result in the reference value field (other parameters remain unchanged), and provide the measurement response to the resource management apparatus.

In the case that the wireless resources are spectrum resources, in addition to the above parameters, the measurement request may include, for example, a threshold for duration when the successful transmission lasts, and the like. The specific setting of the measurement request depends on specific scenarios and demands.

Figure 2:
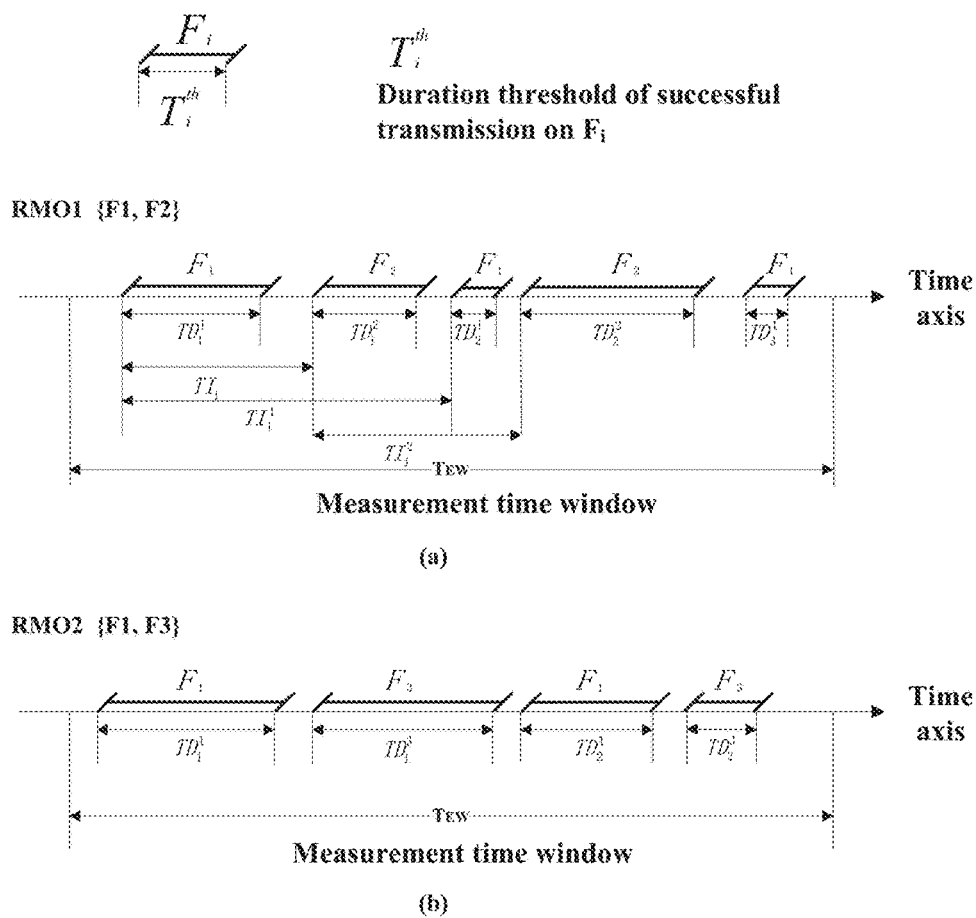
FIG. 2 is a schematic diagram showing a measurement object and a measurement time window.

FIG. 2 is a schematic diagram showing a measurement object and a measurement time window. A duration threshold $T_i^{th}$ of successful transmission is set for each spectrum $F_i$, and thresholds for different spectrums may be the same or different. As shown in (a) of FIG. 2, available spectrums for a resource management object $RMO_1$ include $F_1$ and $F_2$. A measurement time window $T_{EW}$ defines a start time point and duration of the measurement. Spectrum utilization behaviors and results of the resource management object within the measurement window $T_{EW}$ are shown in FIG. 2. For example, $TD_1^1$ and $TD_1^2$ respectively indicate durations of the first transmission of the resource management object $RMO_1$ on the spectrums $F_1$ and $F_2$, $TI_1$ represents duration of an interval between two adjacent transmissions, and $TI_1^1$ and $TI_1^2$ respectively represent duration of an interval between the two adjacent transmissions on the spectrum $F_1$ and on the spectrum $F_2$. Similarly, spectrum utilization behaviors and results of a resource management object $RMO_2$ within the measurement time window $T_{EW}$ on available spectrums $F_1$ and $F_3$ are shown in (b) of FIG. 2. The measurement time windows for different resource management objects may be set to be the same or different.

Figure 3:
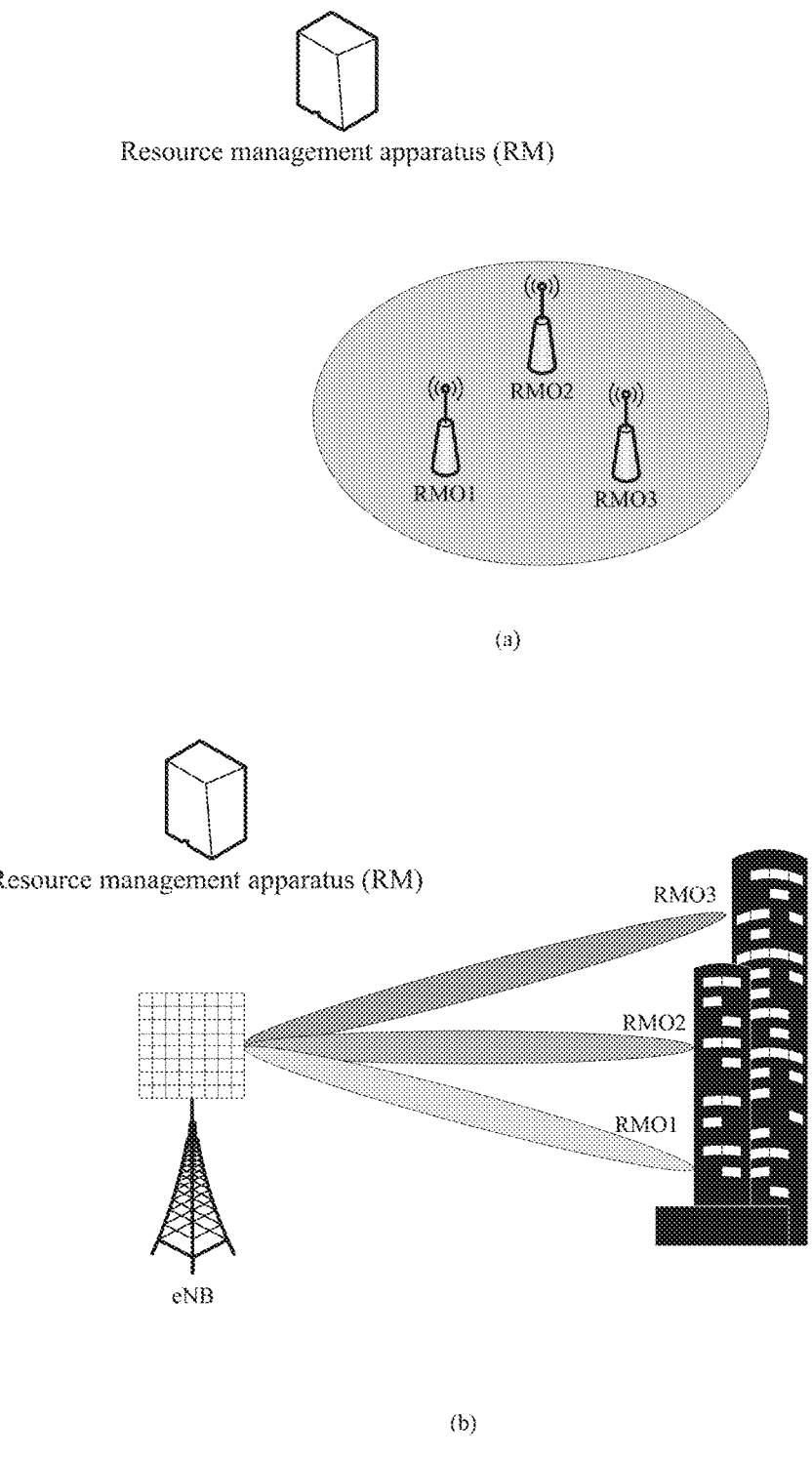
FIG. 3 is a schematic diagram showing a measurement region.

FIG. 3 is a schematic diagram showing a measurement region. As shown in (a) of FIG. 3, the measurement region may be a two-dimensional plane in which resource management objects $RMO_1$ to $RMO_3$ are located. As shown in (b) of FIG. 3, the measurement region may also be a three-dimensional space in which the resource management objects $RMO_1$ to $RMO_3$ are located. The measurement regions for different resource management objects may be set to be the same or different.

Therefore, a distribution range of the resource utilization events may be one of the following: 1) a distribution within multiple spaces and a certain time range, where the multiple spaces may refer to, for example, multiple space dimensions or multiple space regions; 2) a distribution within multiple time ranges and a certain space; and 3) a distribution within a certain space and a certain time range.

The electronic device 100 may generate and transmit the above measurement request periodically or in response to a specific trigger condition.

In the former case, periodic generation and transmission of the measurement request may be achieved by setting a timer. The timer may be maintained by the resource management apparatus. The timer may also be maintained by the resource management database, and the resource management database notifies the resource management apparatus when the timer expires. The determination unit 101 is further configured to determine whether the timer expires, and the generation unit 102 generates the measurement request in a case that the timer expires.

In the latter case, the determination unit 101 is configured to determine whether the predetermined trigger condition is met. The expiration of the timer may be regarded as a kind of trigger condition. In addition, examples of the trigger condition may further include: a. the network communication quality degrades by more than a predetermined degree; b. a request for resource utilization behavior pattern information from another resource management apparatus is received, and the like.

As for the trigger condition a, if the network communication quality is detected by the resource management apparatus, the resource management apparatus may determine, based on its own data, whether the trigger condition is met. On the other hand, whether the trigger condition is met may be determined based on a network quality measurement report transmitted by the resource management object. The measurement report may be periodically measured and transmitted by the resource management object, or may also be transmitted by the resource management object to the resource management apparatus when the communication quality of the resource management object decreases by more than a predetermined degree. In addition, the network quality measurement report may also be a network measurement report from another high priority system, for example, a report required for authorized incumbent protection from an authorized incumbent detection device in an SAS3.5 GHz system.

Further, alternatively, in a case that at least one of the above conditions is met, the determination unit 101 further checks whether information in the resource management database meets requirements, for example, whether content and timeliness of the information meet requirements. If the requirements are met, the information of the resource management database is used for response. If the requirements are not met, the resource management object that is to perform measurement such as identification thereof or the like is determined, and the generation unit 102 generates a corresponding measurement request. The determination of the resource management object depends on the trigger conditions that are met. For example, in the case that the trigger condition a is met, the resource management object that is to perform measurement may include a resource management object whose communication quality decreases, or the like. In the case that the trigger condition b is met, the resource management object that is to perform measurement may include a resource management object in a target region which the resource management apparatus issuing the request is with respect to.

Figure 4:
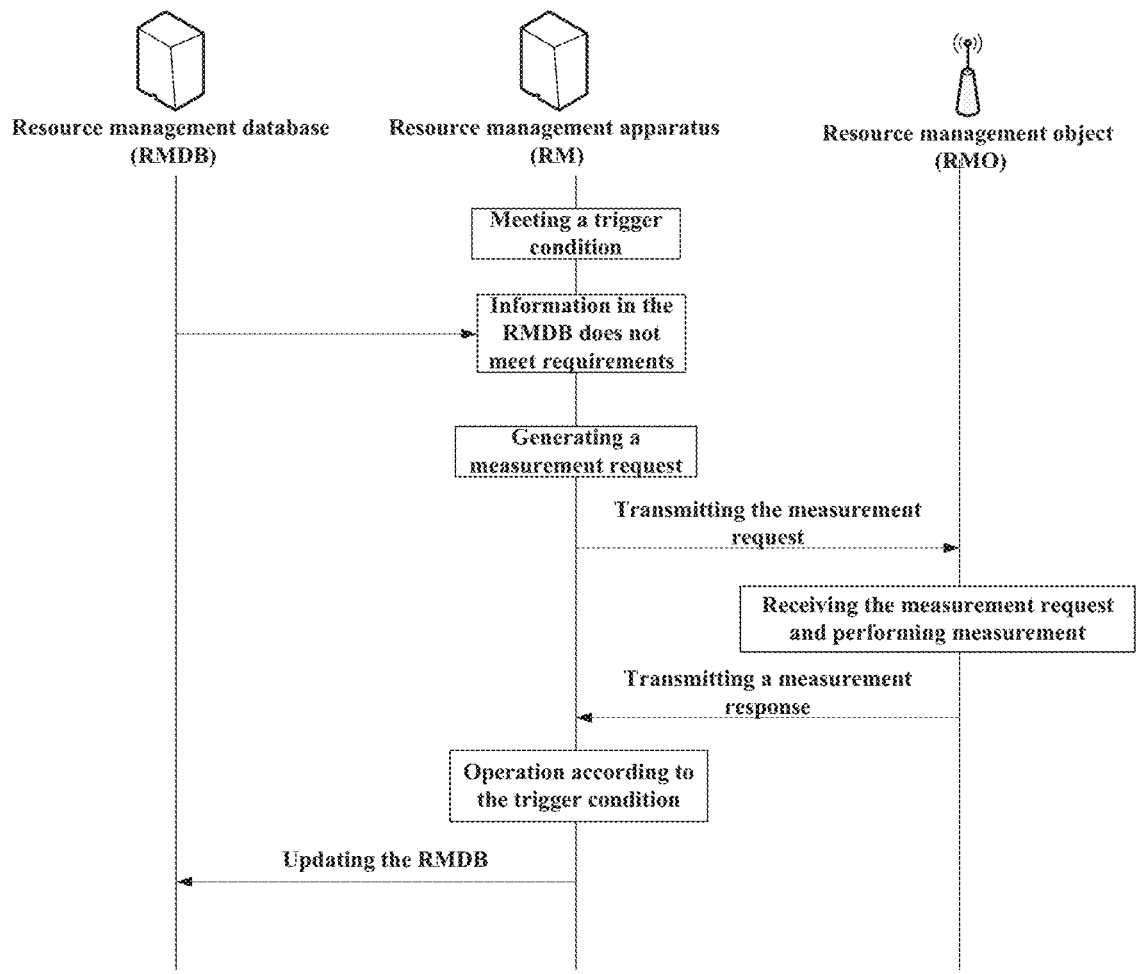
FIG. 4 is a schematic diagram showing an information flow between a resource management database, a resource management apparatus, and a resource management object.

For ease of understanding, FIG. 4 is a schematic diagram showing an information flow between a resource management database, a resource management apparatus, and a resource management object when the resource management apparatus operates in response to a trigger condition. As shown in FIG. 4, when a certain trigger condition is met, for example, when the timer expires, when a network quality measurement report is received, or when a request for resource utilization behavior pattern information from another resource management apparatus is received, the resource management apparatus firstly checks whether information in the resource management database meets the requirements. It is assumed in FIG. 4 that the information does not meet the requirements. In this case, the resource management apparatus generates a measurement request including a measurement object, a measurement time window, a measurement target region, and the like, and transmits the measurement request to the resource management object that is to perform measurement. As described above, the resource management object as a transmission target may be determined by the determination unit 101 in accordance with the trigger condition. After receiving the measurement request, the resource management object performs corresponding measurement according to the parameters included in the measurement request, and provides the measurement result to the resource management apparatus via a measurement response. Next, the resource management apparatus performs an operation corresponding to the trigger condition using the measurement response, and further updates the information in the resource management database as appropriate.

As an example, operations corresponding to the trigger conditions a and b are, for example, performing system reconfiguration, and providing resource utilization behavior pattern information to another resource management apparatus, respectively.

Figure 5:
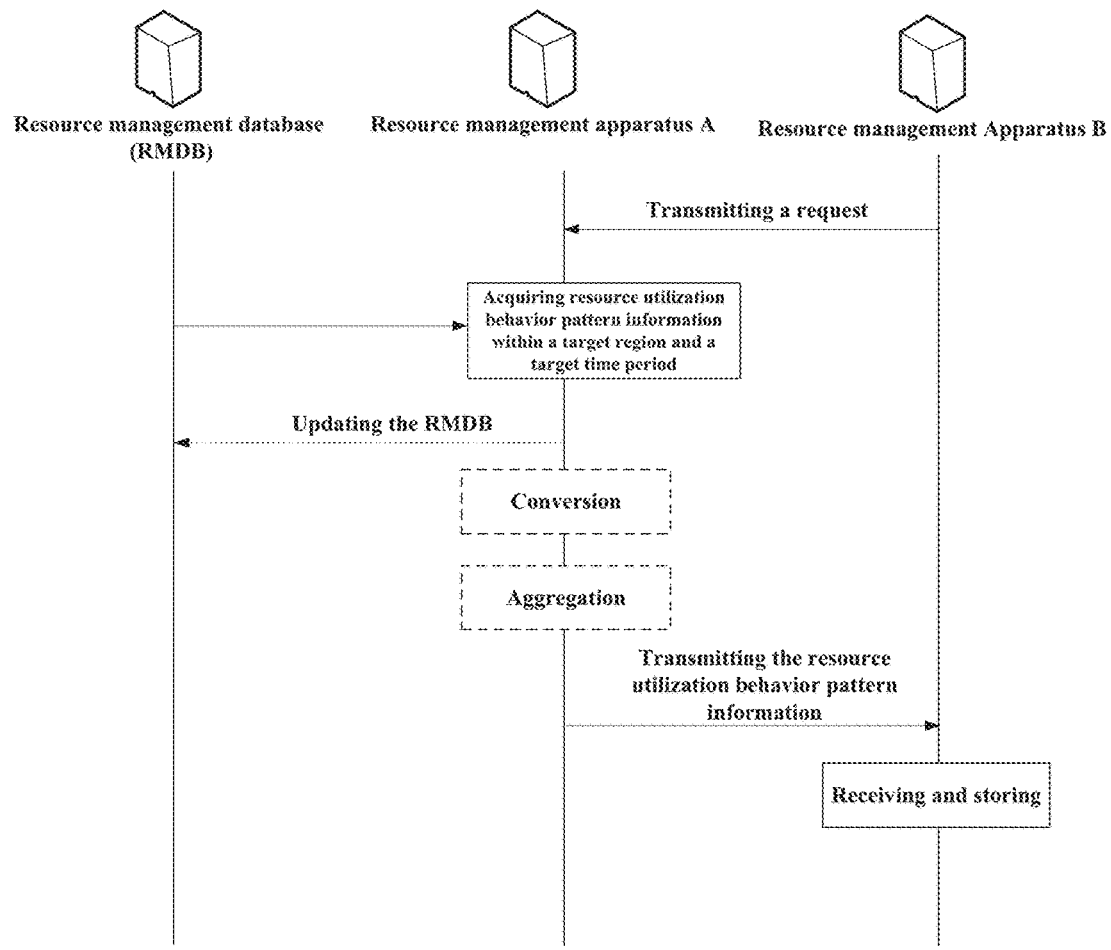
FIG. 5 is a schematic diagram showing an information flow of exchange of resource utilization behavior pattern information between a resource management apparatus A and a resource management apparatus B based on a request.

In response to the request for resource utilization behavior pattern information from another resource management apparatus, the transceiving unit 103 is further configured to transmit the measured resource utilization behavior pattern information of the resource management object to the another resource management apparatus. Such information interaction may be used to exchange information of resource management objects located in an overlapping region between management regions of the resource management apparatuses to achieve coexistence management between the management regions. FIG. 5 is a schematic diagram showing an information flow of exchange of resource utilization behavior pattern information between a resource management apparatus A and a resource management apparatus B based on a request. Since the resource management apparatuses are peer-to-peer, operations between the two resource management apparatuses are symmetric. For the sake of brevity, only the case that the resource management apparatus B acquires information from the resource management apparatus A is shown.

Firstly, the resource management apparatus B requests the resource management apparatus A for resource utilization behavior pattern information of a resource management object within a target time period and a target region, where the target region may be, for example, an overlapping region between management regions of the two resource management apparatuses. After receiving the request, the resource management apparatus A acquires information of the resource utilization behavior pattern of the resource management object within the target time period and the target region from a resource management database. For example, the resource management apparatus A may further check whether the information meets requirements, for example, whether content and/or timeliness of the information meet the requirements. In a case that the requirements are not met, the resource management apparatus A instructs the corresponding resource management object to perform measurement, and provides information obtained by the measurement to the resource management apparatus B. Further, the resource management apparatus A may also update the resource management database as indicated by the dashed line in FIG. 5. After receiving the information of the resource utilization behavior pattern transmitted by the resource management apparatus A, the resource management apparatus B may store the information, for resource management.

In addition, as shown by a dashed line block in FIG. 5, the resource management apparatus A may process the information of the resource utilization behavior pattern before the transmission, to convert it into a format suitable for the resource management apparatus B. The operation may be performed, for example, by the generation unit 102 of the electronic device 100. Furthermore, the generation unit 102 may aggregate the information of the resource utilization behavior pattern, and the transceiving unit 103 transmits the aggregated information to another resource management apparatus (i.e., the resource management apparatus B).

This is because that, in some scenarios, such as a scenario in which a resource management object is required to be protected, it is required to hide feature information of the resource management object during information interaction between resource management apparatuses. Through the aggregation, in the interaction of the resource utilization behavior pattern information, aggregated results of resource utilization behavior pattern information of resource management objects in a target region on spectrums are interacted, instead of the interaction of resource utilization behavior pattern information of individual resource management objects on spectrums.

Taking the frequency of successful transmission as an example of the resource utilization behavior pattern, the following aggregation mode may be adopted. The frequency of successful transmission is the number of successful transmissions using the spectrum per unit time. For example, an arithmetic average of the frequency of the successful transmission of the resource management objects on each spectrum may be calculated. Alternatively, a weighted average of the frequency of the successful transmission of the resource management objects on each spectrum may be calculated, where the weight may represent an influence degree of each resource management object with respect to spectrum utilization of a user in a specific region. For example, the closer the distance from the resource management object to the specific region is, the higher the influence degree is, and the higher the weight is. Further, an average of sums of the frequency of successful transmission of resource management objects in each spectrum on the unit area in a target region may be calculated. It should be understood that only non-limiting examples of the resource utilization behavior pattern and the aggregation manner are shown herein for illustrative purposes only.

Further, in addition to the interaction based on request, the resource management apparatus may provide resource utilization behavior pattern information to another resource management apparatus in a case that a specific condition is met, for example, after a predetermined time has elapsed, a change of the resource utilization behavior pattern information exceeds a predetermined degree, or the like.

In summary, in this embodiment, the electronic device 100 generates a measurement request for a resource utilization behavior pattern to instruct the resource management object to measure the resource utilization behavior pattern in a specific time range and a specific space range, so as to obtain information of the resource utilization behavior pattern. The information may be used by, for example, the resource management apparatus for resource allocation, which can effectively extend utilization duration of the resource management object with respect to the resources, and reduce the consumption due to system reconfiguration, thereby improving resource utilization efficiency.

Second Embodiment

In a heterogeneous radio access network, when a resource management object requires wireless resources, the resource management object transmits a request to a resource management apparatus. The resource management apparatus allocates, based on various factors to be considered, wireless resources for the resource management object in response to the request. It should be understood that the allocation operation may further involve the utilization of wireless resources by other resource management objects.

Figure 6:
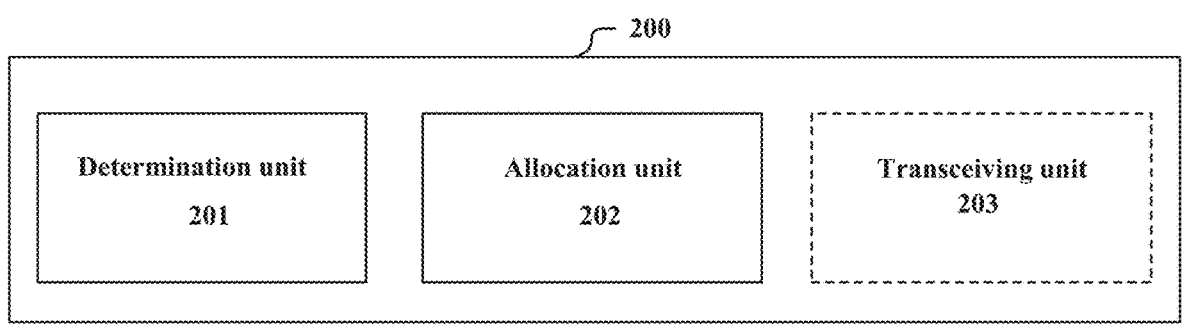
FIG. 6 is a functional block diagram showing an electronic device for a resource management apparatus according to another embodiment of the present disclosure.

An electronic device 200 for a resource management apparatus is provided in this embodiment of the present disclosure. FIG. 6 shows a functional block diagram of the electronic device 200. As shown in FIG. 6, the electronic device 200 includes a determination unit 201, and an allocation unit 202. The determination unit 201 is configured to determine resource utilization behavior patterns of resource management objects within a specific time range and a specific space range. The allocation unit 202 is configured to allocate wireless resources for the resource management objects according to the resource utilization behavior patterns.

The determination unit 201 and the allocation unit 202 may be implemented, for example, by one or more processing circuitries. The processing circuitry may be implemented, for example, as a chip. The electronic device 200 may be arranged in the resource management apparatus or may be communicatively connected to the resource management apparatus.

For example, the determination unit 201 may acquire information of the resource utilization behavior pattern from a resource management database. In other words, the information of the resource management object and the information of the resource utilization behavior pattern are stored by the resource management database and are appropriately provided to the resource management apparatus for resource allocation. Further, the determination unit 201 may also acquire the information of the resource utilization behavior pattern, for example, according to the measurement response obtained in the first embodiment, which is not limitative.

A detailed description of the resource utilization behavior pattern has been given in the first embodiment and will not be repeated herein. It should be noted that the electronic device 200 of the present embodiment and the electronic device 100 of the first embodiment may be used individually or in combination with each other.

After the determination unit 201 determines the information of the resource utilization behavior pattern, the allocation unit 202 allocates the wireless resources for the resource management object according to the resource utilization behavior pattern. For example, the allocation unit 202 may rank, according to the resource utilization behavior pattern, wireless resources to be allocated, to be used for allocating of the wireless resources.

In an example, wireless resources which are estimated, according to the resource utilization behavior pattern, as having a high probability of being successfully used may be ranked in front or provided with a high priority level. As such, the resource management object may preferentially select the wireless resources having the high priority level for data transmission, which can effectively extend utilization duration for the resources, and reduce the consumption due to system reconfiguration, thereby improving resource utilization efficiency.

It should be understood that in a case that the electronic device 100 and the electronic device 200 are combined, the operation of the distribution unit 202 and the operation of the generation unit 102 are independent of each other. In other words, the resource management apparatus may instruct the resource management object to perform measurement and perform resource allocation for the resource management object simultaneously, or not simultaneously. There is no interrelated relationship between the above operations.

Further, the determination unit 201 may further be configured to determine expected interferences between the resource management objects, and the allocation unit 202 is configured to allocate the wireless resources for the resource management objects further based on the expected interferences.

Specifically, the determination unit 201 may obtain, from the resource management database, information of resource management objects involved in resource allocation or reallocation, and resource utilization behavior pattern information, and the determination unit 201 may calculate the expected interferences between the resource management objects based on the information of the resource management objects. Since the resource management apparatus may affect other resource management objects when allocating resources for the resource management object that issues the request, the resource management apparatus needs to consider resource allocation of all affected resource management objects.

The allocation unit 202 performs allocation of the wireless resources based on both the expected interferences and the resource utilization behavior pattern information. The information of the resource management object includes, for example, geographical location information and priority level information of the resource management object, a list of available spectrums (including available spectrums, available time, maximum power, and the like) or a resource pool. In addition, the allocation unit 202 may also use some existing system parameters during operation, such as an upper limit of the number of resource management objects that can be accommodated on each spectrum, which are not be described in detail herein.

In an example, the allocation unit 202 is configured to: divide the resource management objects into multiple management object sets based on the expected interferences, where the resource management objects in each management object set are capable of sharing the same wireless resources; determine, based on the dividing of the management object sets and the resource utilization behavior patterns of the resource management objects, the wireless resources usable by the resource management objects, respectively, with respect to a predetermined optimization target; and merge, with respect to each wireless resource, the resource utilization behavior patterns of the resource management objects which can use the wireless resource, and rank the wireless resources based on a result of the merging, to be used for the allocating of the wireless resources.

For ease of understanding, an example of the division of the management object set based on an interference graph is given below, but it should be understood that the acquisition manner of the management object set is not limited thereto. Further, in this example, the wireless resources to be allocated are spectrum resources, and the resource utilization behavior pattern is the frequency of successful transmission as described above, but it should be understood that these settings are non-limiting and are only for illustrative purposes.

The interference calculation may be performed based on a channel model of a particular network, for example, based on a channel model of path loss. It is assumed that transmission power (this information may be included in the available spectrum information of the resource management object) of a transmitting node is indicated by P, a distance (this information may be calculated from the location information of the transmitting node and a target node) from the transmitting node to the target node is indicated by d, a channel coefficient is indicated by h, and a path loss index is indicated by a (the channel coefficient and the path loss index are given as environmental parameters by the network system). In this case, a signal strength of the expected interferences received by the target node from the transmitting node is indicated by $l=phd^{-\alpha}$.

After the expected interferences are obtained, the resource management apparatus may establish an interference graph in which each vertex represents one related resource management object. The vertex is given a weight, including a priority level of the resource management object corresponding to the vertex, a list of available spectrums, and resource utilization behavior pattern information. When the interferences between the resource management objects exceed a certain threshold, the interferences are considered to be strong, and an edge is connected between vertexes corresponding to the resource management objects. If the interferences are symmetric, an undirected edge may be used. If the interferences are asymmetric, a directed edge may be used, where a tail vertex of the directed edge corresponds to the transmitting node, and a head vertex of the directed edge corresponds to the target node. The edge may also be assigned a weight, including the calculated signal strength of the expected interferences, or a quantized level thereof. In addition, an upper limit of the number of resource management objects that can be accommodated on each available spectrum may also be contained in the graph.

After the interference graph is obtained, the allocation of the wireless resources may be performed according to a predetermined optimization target such as a minimum total number of used spectrums or a maximum average throughput of resource management objects. The following is described by taking a minimum total number of used spectrums as an example.

The division of the management object set is performed using a coloring algorithm based on the above interference graph, where the management object set is a subset of the interference graph, and no edge is connected between any two vertexes in the management object set. During the division of the management object set, the resource management object having a high priority level corresponding to a vertex may be preferentially selected.

Next, available spectrum resources are allocated for each vertex, i.e., each resource management object according to the division of the management object set. For example, each management object set may be considered in order of the number of vertexes in the management object set from the most to the least. Specifically, a subset is selected from a management object set, where resource management objects corresponding to vertexes of the subset have a common available spectrum. The common available spectrum is allocated to the vertexes in the subset. If the number of the vertexes of the subset exceeds the maximum number of resource management objects that can be carried by the available spectrum, the allocation is performed in a descending order of the priority level of the vertexes. In the same priority level, for example, the allocation may be performed in order of the frequency value of successful transmission of vertexes from the largest to the smallest. If the number of the vertexes of the subset is lower than the maximum number of resource management objects that can be carried by the available spectrum, a vertex that does not violate the inter-vertex interference constraint is selected from other vertexes that can use the spectrum to use the available spectrum, until the maximum number of resource management objects that can be carried by the available spectrum is reached or there is no resource management object meeting the above condition in the system. After the above operations, the available spectrum that each resource management object can use is determined.

For each spectrum, the information of the resource utilization behavior patterns of the resource management objects which can use the spectrum is merged. In this example, an average of the frequency of successful transmission of the resource management objects which can use the spectrum may be calculated. Then, in a descending order of the average, each spectrum is sequentially assigned with a value in an order from 1 to n.

Figures 7, 8:
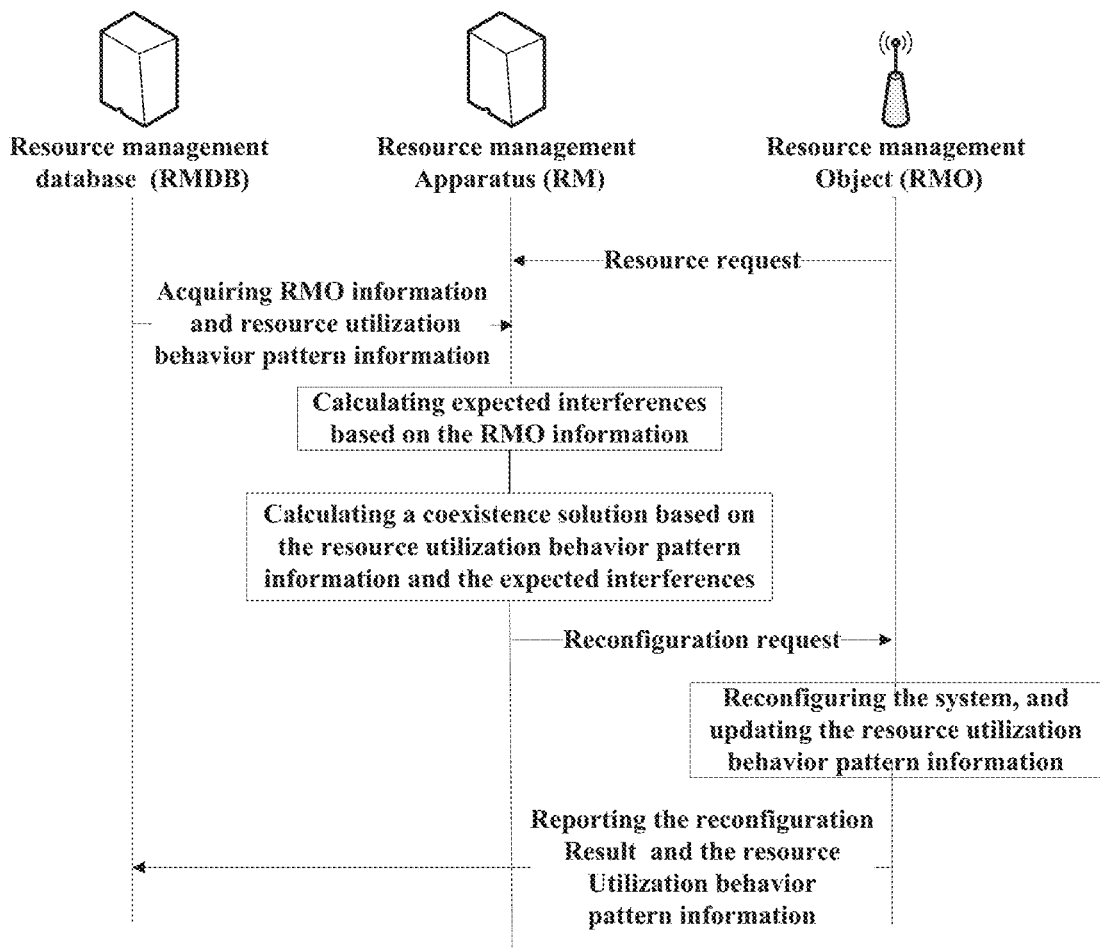
FIG. 7 is a diagram showing an example of resource allocation results for resource management objects.
FIG. 8 is a schematic diagram showing an information flow between a resource management database, a resource management apparatus, and a resource management object.

FIG. 7 shows an example of a resource allocation result of a resource management object $RMO_i, i \in [1,m]$, where each column represents a resource allocation result of a spectrum $F_j, j \in [1,n]$, and a positive element in a matrix indicates a priority level of spectrum utilization, with a small value corresponding to a high priority level, and −1 indicates that the spectrum is not available to the resource management object. In the matrix shown in FIG. 7, the spectrums are ranked as $\{F_1, F_3, F_2, F_n\}$ in a descending order of the average of the frequency of successful transmission.

In another example, the resource utilization behavior pattern information is further considered in the division of the management object set. Accordingly, the allocation unit 202 is configured to: divide the resource management objects into multiple management object sets based on the expected interferences in an order determined according to the resource utilization behavior patterns of the resource management objects, where the resource management objects in each management object set are capable of sharing the same wireless resources; determine, based on the dividing of the management object sets and the resource utilization behavior patterns of the resource management objects, the wireless resources usable by the resource management objects, respectively, with respect to a predetermined optimization target; and merge, with respect to each wireless resource, the resource utilization behavior patterns of the resource management objects which can use the wireless resource, and rank the wireless resources based on a result of the merging, to be used for the allocating of the wireless resources.

It can be seen that, in this example, during the division of the management object set on the interference graph, the order of considering the vertexes is determined by the resource utilization behavior patterns of the resource management objects, so that the division of the management object set may include the influence of the resource utilization behavior pattern. For example, each vertex and each spectrum may be examined in a descending order of the frequency of successful transmission of the vertex on the spectrum. After the management object set is obtained in this way, the allocation and ranking of the wireless resources may be performed in a manner similar to the previous example, which is not repeated herein.

Subsequently, the allocation unit 202 may further generate information about the allocation of the wireless resources to instruct the resource management object. For example, the information about the allocation of the wireless resources may include identification information of the resource management object and ranking information of the wireless resources available to the resource management object. Accordingly, as shown by a dashed line block in FIG. 6, the electronic device 200 further includes a transceiving unit 203. The transceiving unit 203 is configured to transmit the information about the allocation of the wireless resources to the resource management objects. The transceiving unit 203 may be implemented as a transceiver or a transceiver circuitry.

In an example, the allocation unit 202 generates a reconfiguration request including identification information of the resource management object and an ordered sequence of available wireless resources. The transceiving unit 203 transmits the reconfiguration request to the related resource management object. After receiving the reconfiguration request, the resource management object performs corresponding reconfiguration and updates the resource utilization behavior pattern information. The reconfiguration of the resource management object is performed by, for example, reselecting resources according to the received ordered sequence of available wireless resources, where the wireless resources may be selected in an order from the highest priority level to the lowest priority level. For example, for the selected wireless resource, the number of events of attempting to perform utilization is increased accordingly. If the selection successfully meets the QoS requirement of the resource management object and the duration exceeds a certain threshold, the number of events of transmission succeeding is increased accordingly; otherwise, the number of events of transmission failing is increased accordingly. Or, other types of resource utilization behavior pattern information may be updated in other appropriate manners according to actual applications.

In addition, the resource management object may also report the reconfiguration result and the updated resource utilization behavior pattern information to the resource management database.

For ease of understanding, FIG. 8 shows a schematic diagram of an information flow of information exchange between a resource management apparatus, a resource management database, and a resource management object during a process of system resource reconfiguration.

As shown in FIG. 8, a resource management object RMO transmits a resource request to a resource management apparatus RM, and the resource management apparatus acquires related resource management object information and resource utilization behavior pattern information from a resource management database. The related resource management object information and resource utilization behavior pattern information includes corresponding information of the resource management object issuing the request, and further includes corresponding information of other resource management objects that are affected by the resource allocation for the resource management object. Next, the resource management apparatus calculates expected interferences between the resource management objects based on the resource management object information, and calculates a coexistence solution based on the expected interferences and the resource utilization behavior pattern information, such as the ordered sequence of available spectrums as described above. The resource management apparatus transmits a reconfiguration request based on the coexistence solution to the resource management object. The resource management object performs system reconfiguration based on the reconfiguration request and updates the resource utilization behavior pattern information. Then, the resource management object reports the reconfiguration result and the resource utilization behavior pattern information to the resource management database. Alternatively, the resource management object may also report the reconfiguration result and the resource utilization behavior pattern information to the resource management apparatus, and the resource management apparatus updates the resource management database.

For example, with the coexistence management based on the frequency utilization pattern information, a frequency that is efficiently utilized within a given time and/or space interval can be given a high priority level of being used in future by a resource management object within the interval.

In summary, the electronic device 200 allocates wireless resources to the resource management objects according to the resource utilization behavior patterns of the resource management objects within a specific time range and a specific space range, which can effectively extend the utilization duration of the resource management objects for the resources, and reduce the consumptions due to system reconfiguration, thereby improving the resource utilization efficiency.

Third Embodiment

Figure 9:
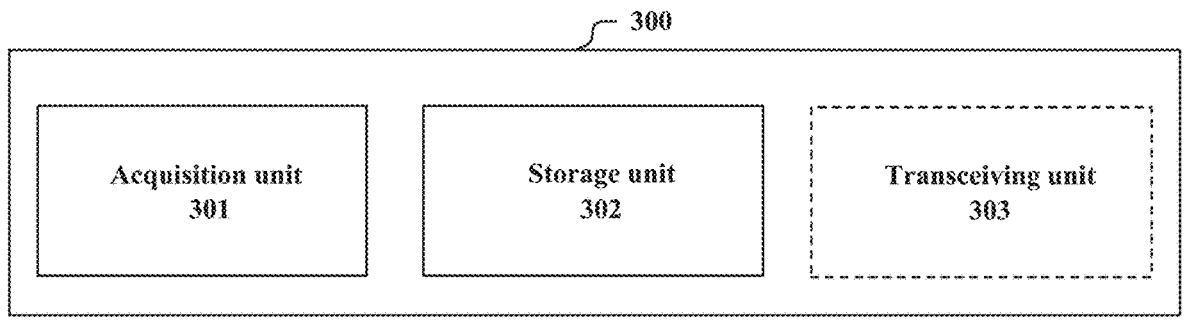
FIG. 9 is a functional block diagram showing an electronic device for a resource management database according to an embodiment of the present disclosure.

FIG. 9 shows a functional block diagram of an electronic device 300 for a resource management database according to an embodiment of the present disclosure. As shown in FIG. 9, the electronic device 300 includes: an acquisition unit 301 and a storage unit 302. The acquisition unit 301 is configured to acquire information relevant to resource utilization behavior patterns of resource management objects. The storage unit 302 is configured to store the resource management objects in association with the information.

The acquisition unit 301 and the storage unit 302 may be implemented, for example, by one or more processing circuitries. The processing circuitry may be implemented, for example, as a chip.

As an example, the acquisition unit 301 may acquire the above information from the resource management object. Alternatively, the acquisition unit 301 may also acquire the above information from the resource management apparatus. In addition, the acquisition unit 301 may also receive information relevant to resource utilization behavior patterns of the resource management objects.

The description of the resource utilization behavior pattern has been given in detail in the first embodiment and will not be repeated here. Exemplarily, the acquired information relevant to the resource utilization behavior patterns may include the content of the measurement response in the first embodiment, and specifically, for example, may include: a wireless resource range (or identification), a measurement object, a measurement time window, a measurement region, measurement parameter values, and the like.

The acquisition unit 301 may update the above information in response to the reporting operation of the resource management object, the updating operation of the resource management apparatus, or update the above information periodically. Accordingly, the storage unit 202 updates the stored content.

In addition, as shown by a dashed line block in FIG. 9, the electronic device 300 further includes: a transceiving unit 303, configured to transmit information of the resource utilization behavior patterns of the resource management objects to the resource management apparatus.

The transceiving unit 303 may be implemented, for example, as a transceiver or a transceiver circuitry, or the like.

The electronic device 300 according to the embodiment may store the resource utilization behavior pattern information associated with the resource management object, for use by the resource management apparatus to perform resource allocation, which can effectively extend utilization duration of the resource management objects with respect to the resources, and reduce consumption due to system reconfiguration, thereby improving resource utilization efficiency.

Fourth Embodiment

Figure 10:
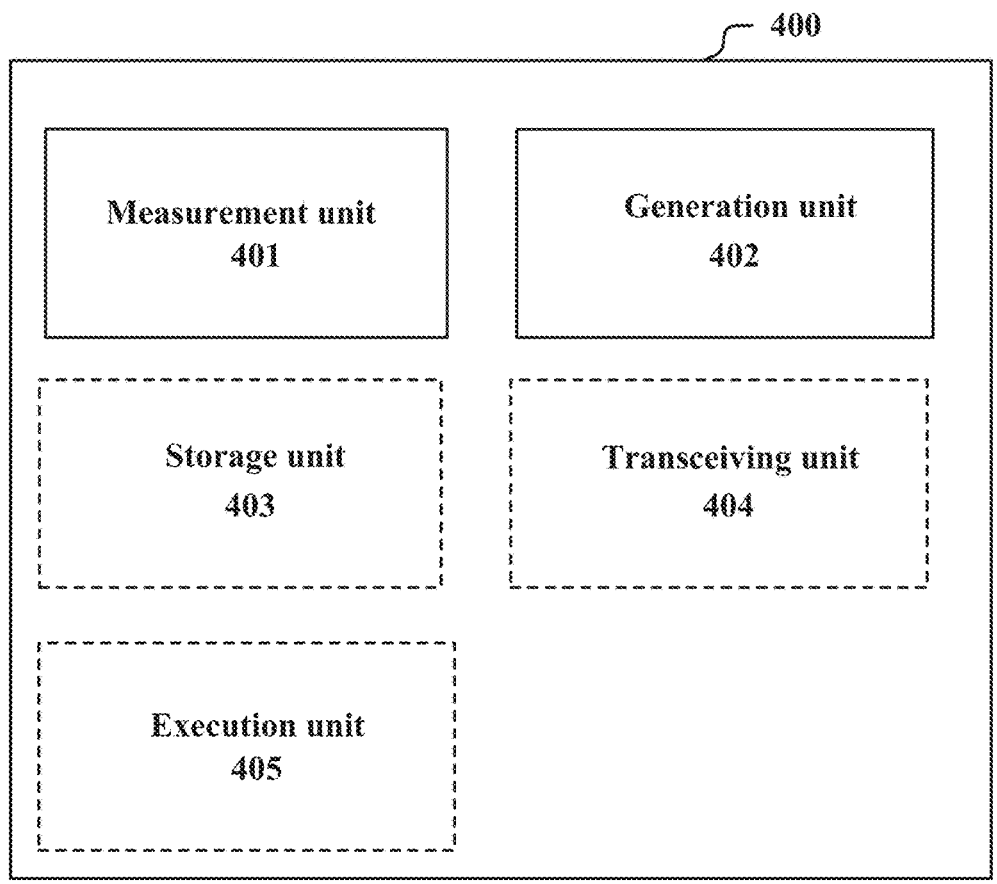
FIG. 10 is a functional block diagram showing an electronic device for a resource management object according to an embodiment of the present disclosure.

FIG. 10 shows a functional block diagram of an electronic device 400 for a resource management object according to an embodiment of the present disclosure. The electronic device 400 includes a measurement unit 401 and a generation unit 402. The measurement unit 401 is configured to measure a resource utilization behavior pattern based on a measurement request from a resource management apparatus. The generation unit 402 is configured to generate a measurement response to the measurement request based on a result of the measuring.

The measurement unit 401 and the generation unit 402 may be implemented, for example, by one or more processing circuitries. The processing circuitry may be implemented, for example, as a chip.

Exemplarily, the measurement request may include, for example, at least one of a measurement object, a measurement time window, and a measurement region. The description of the measurement request has been given in detail in the first embodiment and will not be repeated here.

The measurement unit 401 measures the resource utilization behavior pattern of the resource management object according to respective parameters in the measurement request, for example, with respect to the measurement object within the measurement time window and in the measurement region. The generation unit 402 may, for example, fill the measurement result into a corresponding field of the measurement request to generate a measurement response, which is not limiting. The generation unit 402 may also generate the measurement response in other manners.

In addition, as shown by a dashed line block in FIG. 10, the electronic device 400 may further include: a storage unit 403, configured to store information of the resource utilization behavior pattern. In this case, the storage unit 403 may update the stored information after the measurement unit 401 completes the measurement.

As shown by another dashed line block in FIG. 10, the electronic device 400 may further include: a transceiving unit 404, configured to receive the measurement request from the resource management apparatus and transmit the measurement response to the resource management apparatus. In addition, the transceiving unit 404 may also transmit the measurement response to a resource management database.

In another aspect, the electronic device 400 may further include an execution unit 405, configured to select and utilize wireless resources according to information relevant to allocation of the wireless resources from the resource management apparatus. Accordingly, in the presence of the storage unit 403, the storage unit 403 may be configured to update, based on behaviors of the selecting and utilizing and results of the behaviors, information of the resource utilization behavior pattern of the resource management object.

In addition, the transceiving unit 404 may further be configured to transmit the information of the resource utilization behavior pattern to the resource management database. This transmission may be performed periodically or when the information of the resource utilization behavior pattern is updated. The transceiving unit 404 may further transmit a resource request to the resource management apparatus when the resource management object needs to request the resources.

In this embodiment, the electronic device 400 may measure information of a resource utilization behavior pattern in response to the measurement request, and the information may be used for resource allocation of the resource management apparatus to effectively extend utilization duration of the resource management object with respect to the resources, and reduce consumption due to system reconfiguration, thereby improving resource utilization efficiency.

Fifth Embodiment

In the process of describing the electronic devices in the embodiments described above, obviously, some processing and methods are also disclosed. Hereinafter, an overview of the methods is given without repeating some details disclosed above. However, it should be noted that, although the methods are disclosed in a process of describing the electronic devices, the methods do not certainly employ or are not certainly executed by the aforementioned components. For example, the embodiments of the electronic devices may be partially or completely implemented with hardware and/or firmware, the methods described below may be executed by a computer-executable program completely, although the hardware and/or firmware of the electronic devices can also be used in the methods.

Figure 11:
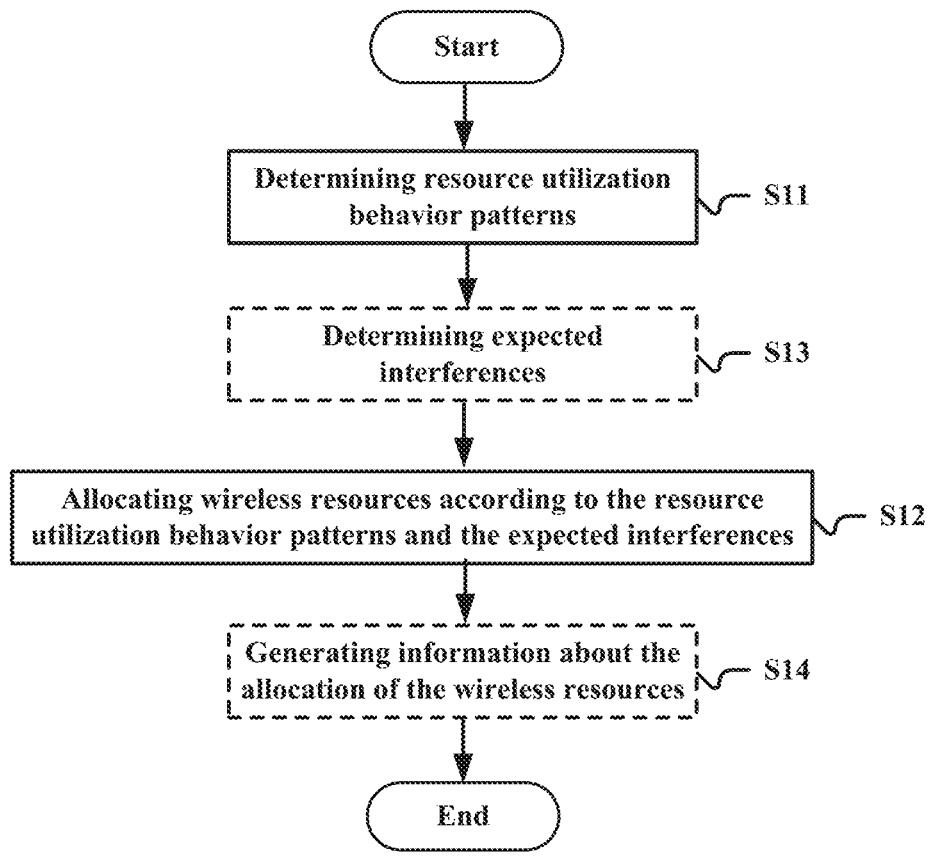
FIG. 11 is a flowchart showing a method for a resource management apparatus according to an embodiment of the present disclosure.

FIG. 11 shows a flowchart of a method for a resource management apparatus according to an embodiment of the present disclosure. The method includes: determining resource utilization behavior patterns of resource management objects within a specific time range and a specific space range (S11); and allocating wireless resources for the resource management objects according to the resource utilization behavior patterns (S12).

In an example, the resource utilization behavior pattern is a distribution of utilization behaviors and utilization results of the resource management object with respect to the wireless resources in time and space. For example, the resource utilization behavior pattern includes a distribution of duration when the resource management objects utilize the wireless resources to perform data transmission within the specific time range and the specific space range. The resource utilization behavior pattern may further include the number of events that the resource management object utilizes the wireless resources within the specific time range and the specific space range or a distribution of intervals between two adjacent events, the events comprising attempting to perform utilization, transmission succeeding, or transmission failing.

For example, in S11, information of the resource utilization behavior patterns may be acquired from a resource management database.

In step S12, wireless resources to be allocated may be ranked according to the resource utilization behavior pattern, to be used for allocating of the wireless resources.

Further, as shown by a dashed line block in FIG. 11, the above method further includes a step S13: determining expected interferences between the resource management objects. Further, in step S12, the wireless resources are allocated for the resource management objects further based on the expected interferences.

Figure 12:
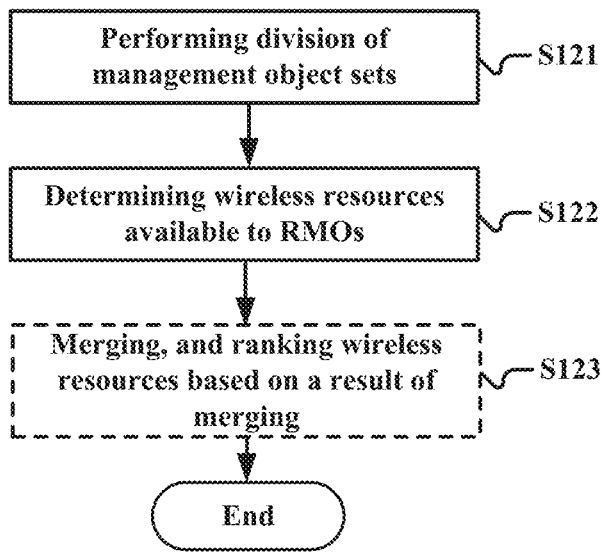
FIG. 12 is a flowchart showing sub-steps of step S12 in FIG. 11.

As an example, as shown in FIG. 12, the step S12 may include the following sub-steps: dividing the resource management objects into multiple management object sets (S121), where the resource management objects in each management object set are capable of sharing the same wireless resources, where the dividing may be performed based on the expected interferences, or may be performed based on the expected interferences in an order determined according to the resource utilization behavior patterns of the resource management objects; determining, based on the dividing of the management object sets and the resource utilization behavior patterns of the resource management objects, the wireless resources usable by the resource management objects, respectively, with respect to a predetermined optimization target (S122); and merging, with respect to each wireless resource, the resource utilization behavior patterns of the resource management objects which can use the wireless resource, and rank the wireless resources based on a result of the merging, to be used for the allocating of the wireless resources (S123).

In addition, as shown by another dashed line block in FIG. 11, the above method may further include a step S14: generating information about the allocation of the wireless resources to instruct a resource management object. The information about the allocation of wireless resources includes, for example, identification information of the resource management object and ranking information of the wireless resources available to the resource management object. Accordingly, although not shown in FIG. 11, the above method may further include a step of transmitting the information about the allocation of the wireless resources to the resource management object.

Further, the above method may further include a step of transmitting at least a part of information of the resource utilization behavior patterns of the resource management objects to another resource management apparatus. The step may be performed, for example, periodically, in response to a request from the other resource management apparatus, or when a change of information of the resource utilization behavior pattern exceeds a predetermined degree. Further, the information may be converted and/or aggregated before being transmitted.

Figure 13:
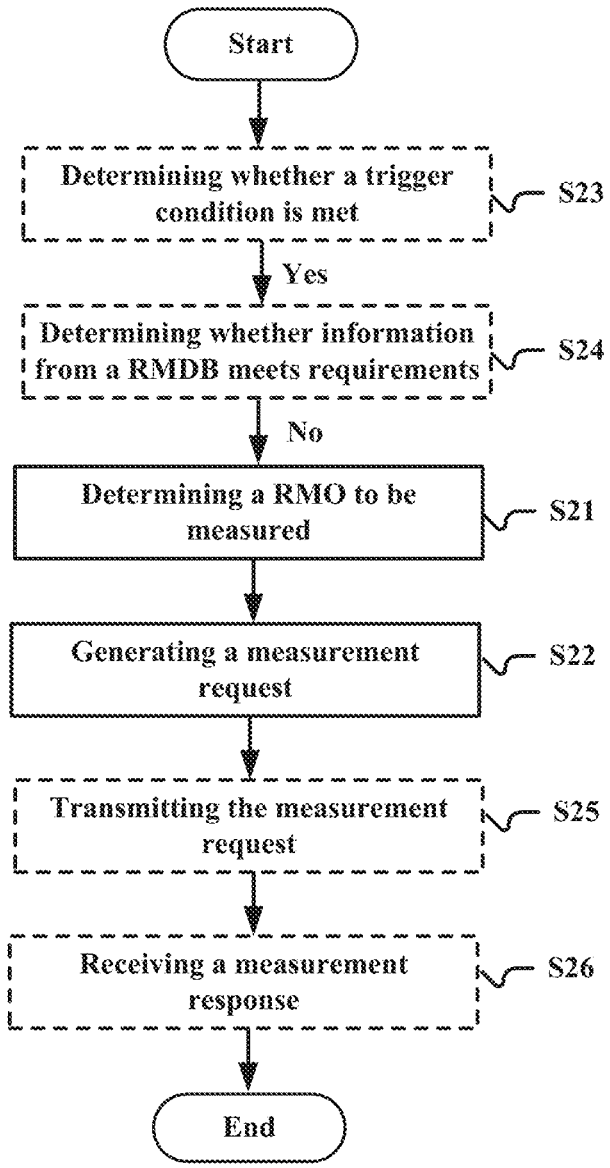
FIG. 13 is a flowchart showing a method for a resource management apparatus according to an embodiment of the present disclosure.

FIG. 13 shows a flowchart of a method for a resource management apparatus according to another embodiment of the present disclosure. The method includes: determining a resource management object of which resource utilization behavior pattern information is to be measured within a specific space range and a specific time range (S21); and generating a measurement request to instruct the resource management object to measure the resource utilization behavior pattern information (S22).

The measurement request includes, for example, at least one of a measurement object, a measurement time window, and a measurement region.

Further, as shown by a dashed line block in FIG. 13, the above method may further include a step of determining whether a trigger condition is met (S23). The operations of steps S21 and S22 are performed in a case that the trigger condition is met. The trigger condition may include at least one of the following: a timer expires, the network communication quality decreases by more than a predetermined degree, and a request for resource utilization behavior pattern information from another resource management apparatus is received.

As shown by another dashed line block in FIG. 13, the above method may further include a step S24: determining whether the information from the resource management database meets requirements such as requirements for information content and timeliness. The operations of steps S21 and S22 are performed in a case that the requirements are not met, otherwise the information from the resource management database may be used for response.

The above method may further include a step S25 of transmitting a measurement request; and a step S26 of receiving a measurement response from the resource management object. In addition, the resource management apparatus may also update the information of the resource management database based on the measurement response.

Figure 14:
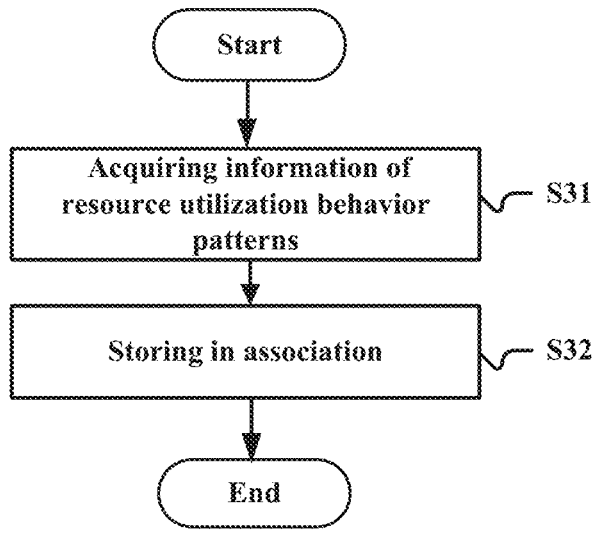
FIG. 14 is a flowchart showing a method for a resource management database according to an embodiment of the present disclosure.

FIG. 14 shows a flowchart of a method for a resource management database according to an embodiment of the present disclosure. The method includes: acquiring information relevant to resource utilization behavior patterns of resource management objects (S31); and storing the resource management objects in association with the information (S32).

Although not shown in FIG. 14, the method further includes: updating the information in response to the reporting operation of the resource management object or periodically. Further, the above method further includes transmitting the information relevant to the resource utilization behavior patterns of the resource management objects to a resource management apparatus.

Figure 15:
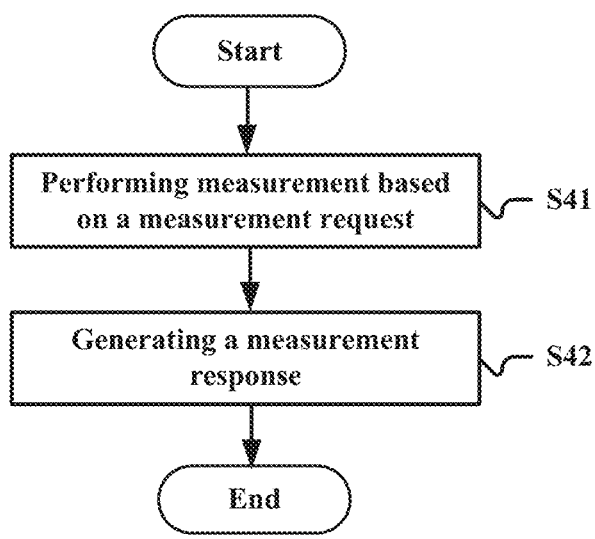
FIG. 15 is a flowchart showing a method for a resource management object according to an embodiment of the present disclosure.

FIG. 15 shows a flowchart of a method for a resource management object according to an embodiment of the present disclosure. The method includes: measuring, based on a measurement request from a resource management apparatus, a resource utilization behavior pattern (S41); and generating, based on a result of the measuring, a measurement response to the measurement request (S42).

Although not shown in FIG. 15, the method may further include the following steps: selecting and utilizing wireless resources according to information relevant to allocation of the wireless resources from the resource management apparatus; and updating, based on behaviors of the selecting and utilizing and results of the behaviors, information of the resource utilization behavior pattern of the resource management object. The updating may further include reporting to the resource management database for updating.

It should be noted that the above methods may be used in combination with each other or individually, and the details thereof have been described in detail in the first to fourth embodiments, which are not repeated herein.

Sixth Embodiment

In this embodiment, application scenario examples of the electronic devices 100 to 400 and the above methods in different coexistence management systems will be given. It should be understood that the application examples are only for illustrative purposes and are not limiting. The electronic devices 100 to 400 and the methods described above may be applied to other various suitable scenarios.

Example 1: ETSI RRS System

In a Reconfigurable Radio System (RSS) standard of the European Telecommunication Standards Institute (ETSI), how a television device as a primary system and a Cognitive Radio System (CRS) as a secondary system effectively share a TV band is studied. Involved logical entities include a Geolocation Database (GLDB) and a Spectrum Coordinator (SC).

The resource management database in the present disclosure is equivalent to the GLDB, the resource management apparatus is equivalent to the SC, and the resource management object is equivalent to the CRS. The technical solution of the present disclosure may be applied to the ETSI RRS system, for example, for coexistence management.

Figure 16:
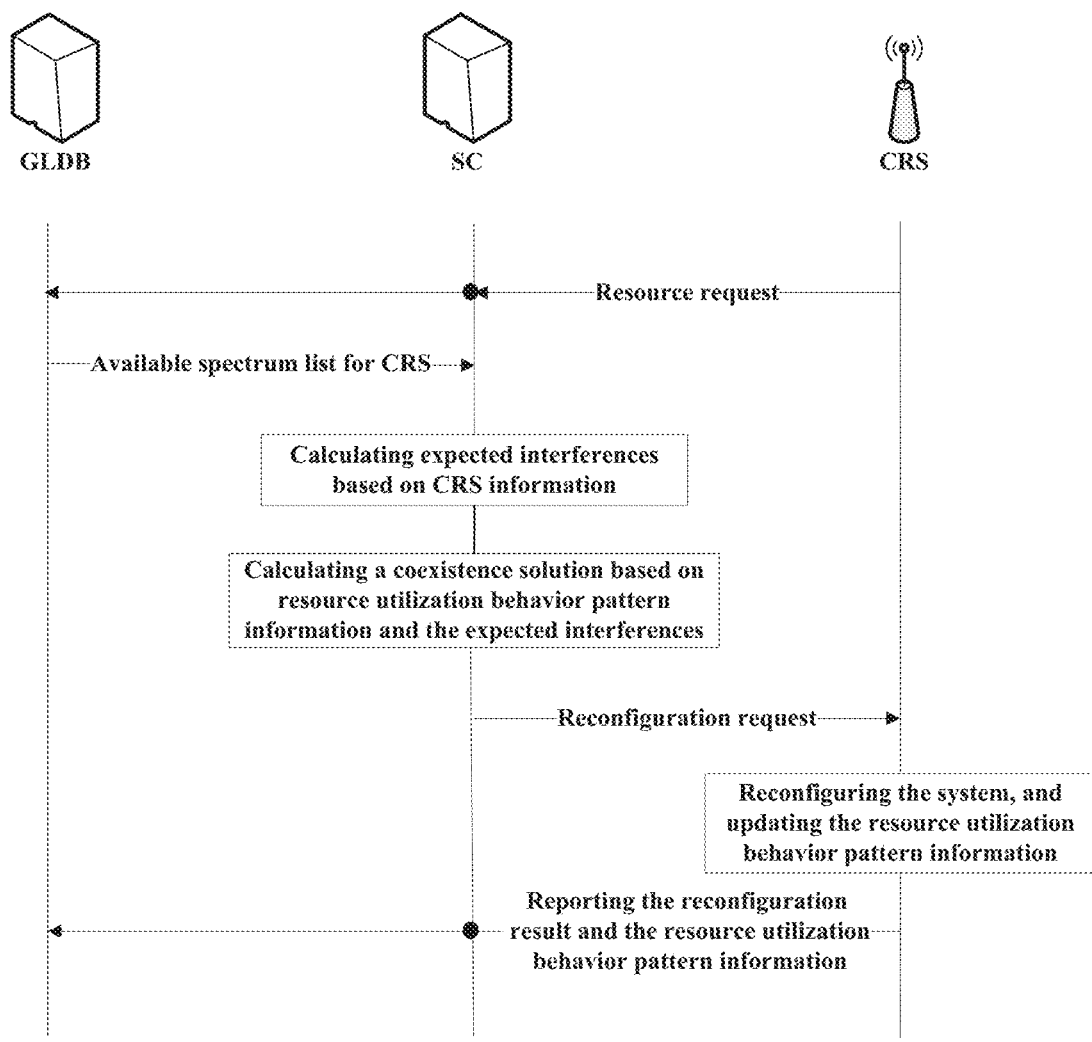
FIG. 16 is a schematic diagram showing an information flow between logical entities in an ETSI RRS system.

Due to the difference in the definition of logical entity functions, a signaling flow for allocating resources for the CRS in the ETSI RRS system is slightly different from the flow described in the second embodiment, which is shown in FIG. 16. The main difference lies in that: the CRS transmits a resource request to the GLDB through the SC; the GLDB allocates an available spectrum list for the CRS according to the request, and transmits the available spectrum list to the SC through a response; and the CRS reports a reconfiguration result to the SC and the GLDB, where the result includes resource utilization behavior pattern information. Therefore, after the flow shown in FIG. 16 of the present disclosure is applied, the CRS can optimize the utilization of the available spectrum.

In addition, in this instance, a signaling interaction flow between the SCs is the same as the signaling interaction flow between the resource management apparatuses in the present disclosure, which is not repeated herein.

Example 2: IEEE P802.19.1a System

In the IEEE P802.19.1a standard, how to utilize the coexistence management to solve the problem of inefficient resource utilization is studied. Involved logical entities include: coexistence managers (CMs) for providing coexistence management; a coexistence discovery and information server (CDIS) for storing system information for the CM; a Geolocation Capability Object (GCO) representing a single device or a network formed by multiple devices that operate based on certified geolocation capabilities and acquire coexistence services from the CM; and a coexistence enabler (CE) used for information interaction between a coexistence system and the GCO.

Figure 17:
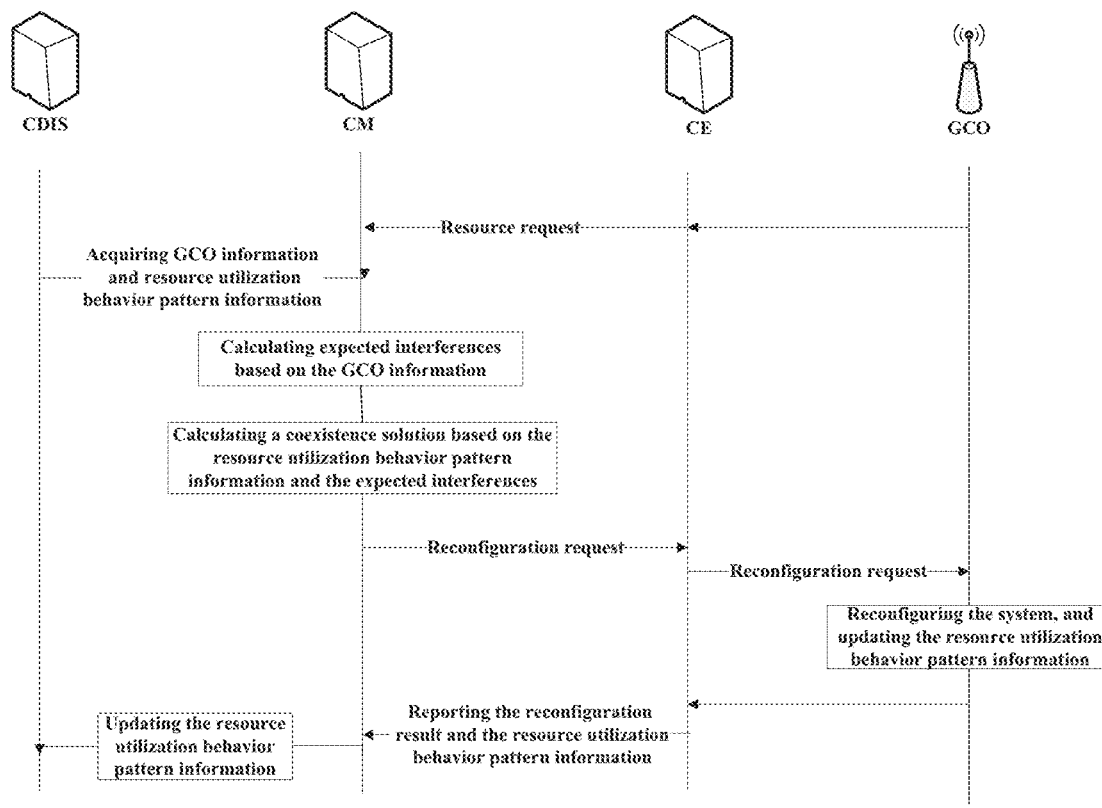
FIG. 17 is a schematic diagram showing an information flow between logical entities in an IEEE P802.19.1a system.

The resource management database in the present disclosure is equivalent to the CDIS, the resource management apparatus is equivalent to the CM, and the resource management object is equivalent to the GCO. Due to the difference in the definition of logical entity functions, an operation flow for providing coexistence management for the GCO in the IEEE 802.19.1a system is slightly different from the flow described in the second embodiment, which is shown in FIG. 17. The main difference lies in that: the CE transmits a reconfiguration request to the corresponding GCO, and reports the updated resource utilization behavior pattern information of the GCO after the configuration is completed to the CM, and the CM updates the resource utilization behavior pattern information of the corresponding GCO in the CDIS. This is because that the CE provides an interface to the coexistence management system for the GCO.

Figure 18:
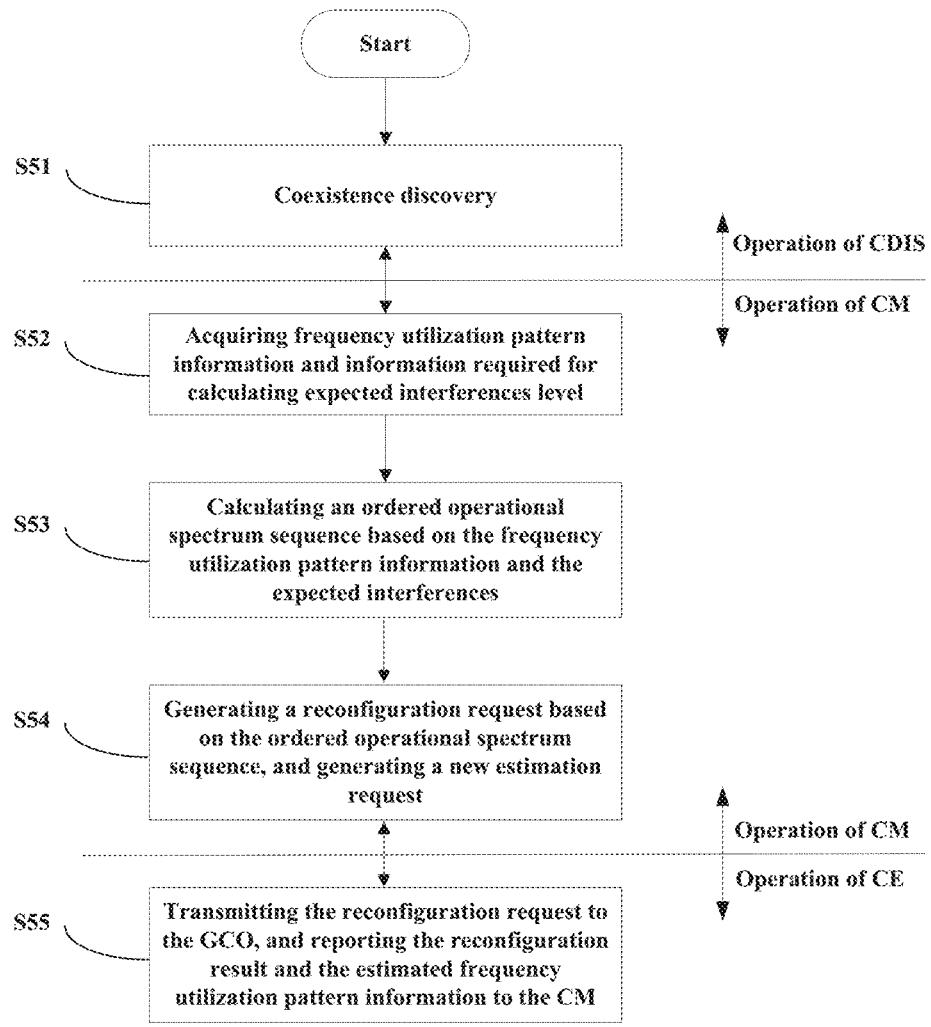
FIG. 18 is a flowchart showing operations of logical entities in an IEEE P802.19.1a system.

Further, FIG. 18 shows a flowchart of operations of the logical entities in the IEEE P802.19.1a system, where a frequency utilization pattern is taken as an example of the resource utilization behavior pattern. As shown in FIG. 18, step S51 is performed by the CDIS, in which coexistence discovery is performed. Steps S52 to S54 are performed by the CM. In step S52, the CM acquires frequency utilization pattern information and information required for calculating expected interferences from the CDIS. Further, the CM may also provide such information to the CDIS for updating the CDIS. In step S53, the CM calculates an ordered operational spectrum sequence based on the acquired frequency utilization pattern information and the expected interferences. In step S54, the CM generates a reconfiguration request based on the ordered operational spectrum sequence. Further, in step S54, the CM may generate a new estimation request, such as the measurement request described in the first embodiment. Step S55 is performed by the CE. In this step, the CE transmits the reconfiguration request to the GCO and reports the reconfiguration result to the CM. Further, the CE may also report the estimated frequency utilization pattern information to the CM.

With the coexistence management based on the frequency utilization pattern, a frequency that is efficiently utilized within a given time and/or space interval can be given a high priority level of being used in future by a GCO within the interval.

In addition, in this instance, the signaling interaction flow between the CMs is the same as the signaling interaction flow between the resource management apparatuses in the present disclosure, which is not repeated herein.

Example 3: SAS3.5 GHz System

In the Spectrum Access System (SAS), sub-coexistence management between multiple systems in the 3.5 GHz band is studied. In the United States, the 3.5 GHz band has been used for the Department of Defense (DoD) radar system, and the Federal Communications Commission (FCC) is currently discussing the commercial use of this band through spectrum sharing. The sharing system is a part of the SAS and includes three levels: incumbent user, Fixed Satellite Service (FSS) and grandfathered terrestrial wireless operations within a limited time period, and citizen broadband wireless service. The level of incumbent user represents the highest level and needs to be protected from harmful interferences from Citizens Broadband Radio Service Devices (CBSDs). The incumbent user contains the above mentioned DoD radar system. The citizen broadband wireless service includes levels of priority access license (PAL) and General Authorized Access (GAA). It needs to protect the PAL from harmful interferences from the GAA. The citizen broadband wireless service allocates resources in units of census tracts. The Priority access license (PAL) may use spectrums in the range of 3550 MHz to 3650 MHz, and is issued in unit of 10 MHz with a time limit of 3 years. All PALs in each census tract occupy spectrums totally not exceeding 70 MHz, and the spectrum occupied by each PAL does not exceed 40 MHz. The GAA may use spectrums in the range of 3550 MHZ to 3700 MHz without causing harmful interferences to high-level users. Logical entities used for resource management mainly include the SAS and a domain proxy. The domain proxy interacts with the SAS on behalf of the individual CBSD or the network CBSD to obtain the service for the CBSD. The CBSD may also directly interact with the SAS to obtain the service without using the domain proxy.

Figure 19:
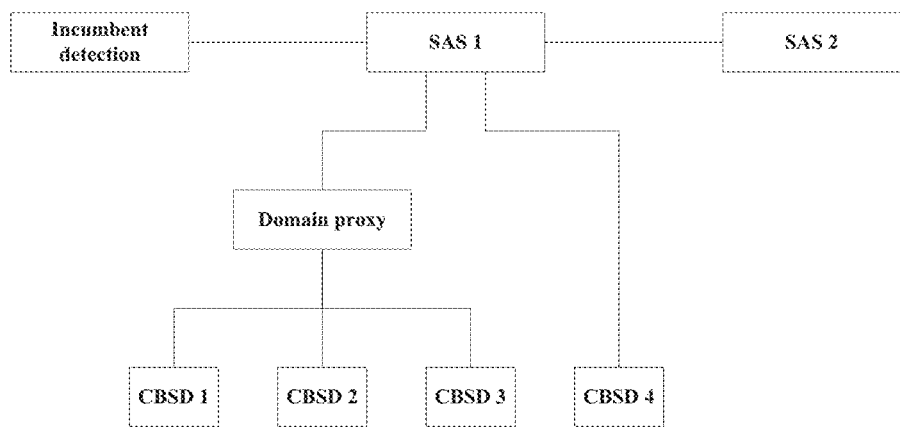
FIG. 19 is a schematic diagram showing a relationship between logical entities in an SAS3.5 GHz system.

The SAS is equivalent to the resource management database and the resource management apparatus in the present disclosure, and the CBSD is equivalent to the resource management object in the present disclosure. A domain proxy may exist between some CBSDs and the SAS, as shown in FIG. 19.

In this embodiment, the SAS provides the coexistence service for the CBSDs according to the resource utilization behavior pattern information and the expected interferences, and the CBSD reports the reconfiguration result to the SAS, including the updated resource utilization behavior pattern information. If there is a domain proxy between the SAS and the CBSD, the information interaction between the SAS and the CBSD is performed through the domain proxy.

In this instance, the signaling interaction flow between the SASs is the same as the signaling interaction flow between the resource management apparatuses in the present disclosure, which is not repeated herein.

Example 4: Proximity Service Communication System

The fifth-generation communication system (5G) supports the growing number of user devices and service types, and the Proximity Service (ProSe) has recently received widespread attention from industry and academia. Proximity services include Device to Device (D2D) communication, Vehicle to X (V2X, where X refers to vehicles, network infrastructure, pedestrians or the like), Machine to Machine (M2M) network, Internet of Things (IoT). The technical solution of the present disclosure may also be applied to a scenario of a proximity service.

Figure 20:
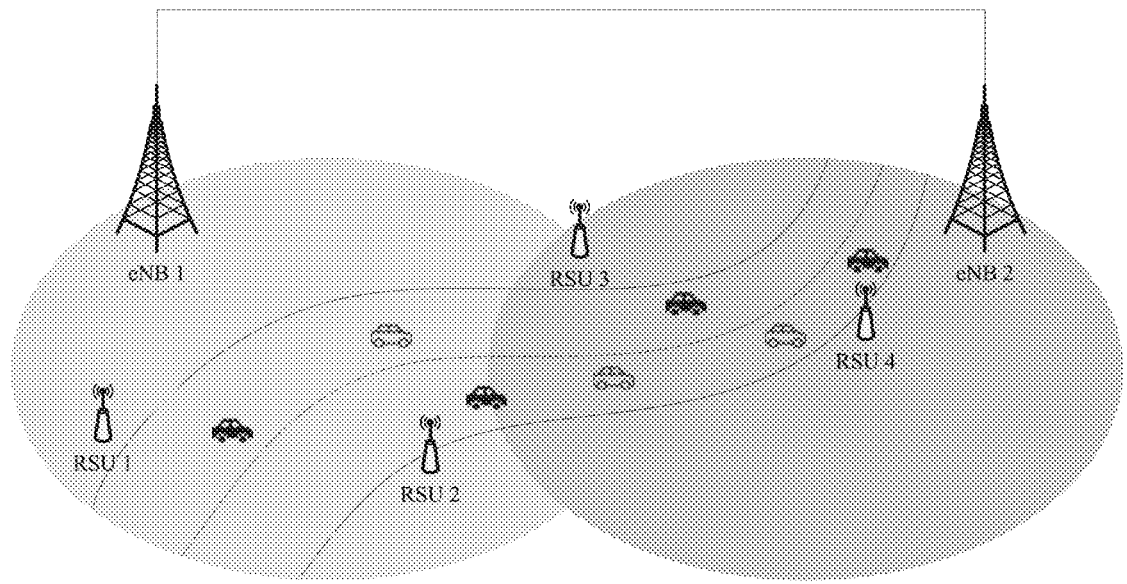
FIG. 20 is a schematic diagram showing an example of a proximity service communication system.

The following description is given by taking the 3GPP LTE-V2X as an example of the proximity service. It should be understood that this is only for illustrative purposes and is not limiting. The base station (BS) or the roadside unit (RSU) as the network infrastructure is equivalent to the resource management database and the resource management apparatus in the present disclosure, and the vehicle device is equivalent to the resource management object, as shown in FIG. 20.

In this scenario, for example, the BS or the RSU allocates resources for the vehicle devices. Specifically, the BS or the RSU may provide resource allocation for the vehicle devices according to resource utilization behavior pattern information and expected interferences, for example, may generate an ordered resource sequence in a resource pool for the vehicle devices, thereby improving resource utilization efficiency of the vehicle devices by reducing the time taken for resource selection, increasing effective information transmission time length, and ensuring information transmission quality. In addition, the vehicle device measures and updates the resource utilization behavior pattern information on the resource pool and reports the information to the BS or the RSU, for assisting in the subsequent resource allocation.

Alternatively, the vehicle device may select a resource by itself. For example, the vehicle device measures and updates the resource utilization behavior pattern information on the resource pool during the operation process, and utilizes the information to perform resource selection.

In addition, the resource utilization pattern information may be exchanged between the BS or the RSU and other BSs or RSUs, and the signaling interaction flow thereof is the same as the signaling interaction flow between the resource management apparatus in the present disclosure, which is not repeated herein.

It can be understood that although four application scenarios are given as examples above, the application scope of the present disclosure is not limited thereto, and the technology of the present disclosure can be suitably applied to any scenario in which it is required to measure and utilize resource utilization behavior pattern information.

The technology of the present disclosure can be applied to various products. For example, the electronic devices 100 to 400 may each be implemented as any type of server, such as a tower server, a rack server, and a blade server. The electronic devices 100 to 400 may each be a control module (such as an aggregated circuit module including a single wafer, and a card or blade inserted into a slot of the blade server) mounted on a server. In addition, the electronic devices 100 to 400 may each be implemented as various types of base stations. For example, the base station may be implemented as any type of evolution Node B (eNB), such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function

[Application Example Regarding Server]

Figure 21:
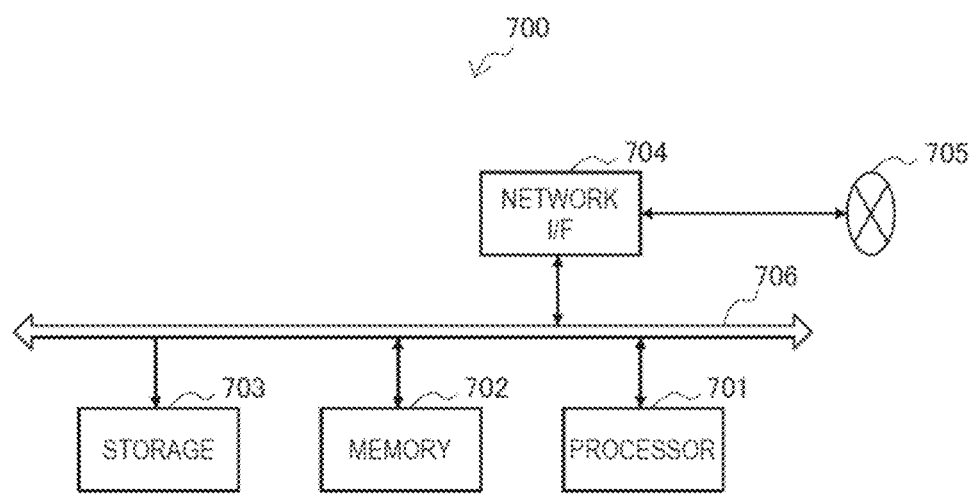
FIG. 21 is a block diagram illustrating an example of a schematic configuration of a server 700 to which the technology of the present disclosure may be applied.

FIG. 21 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a memory medium, such as a semiconductor memory and a hard disc.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703 and the network interface 704 together. The bus 706 may include two or more buses (such as a high speed bus and a low speed bus) each of which has different speed.

In the server 700 shown in FIG. 21, the determination unit 101 and the generation unit 102 described with reference to FIG. 1, the determination unit 201 and the allocation unit 202 described with reference to FIG. 6, the acquisition unit 301 described with reference to FIG. 9, and the measurement unit 401, the generation unit 402, and the execution unit 405 described with reference to FIG. 10 may be implemented by the processor 701. The storage unit 302 described with reference to FIG. 9 and the storage unit 403 described with reference to FIG. 10 may be implemented by the storage 703. For example, the processor 701 may perform generation of a measurement request for a resource management object by performing functions of the determination unit 101 and the generation unit 102. The processor 701 may perform allocation of wireless resources based on resource utilization behavior pattern information by performing functions of the determination unit 201 and the allocation unit 202. The processor 701 may perform acquisition and update of the resource utilization behavior information of the resource management object by performing a function of the acquisition unit 301. The processor 701 may perform measurement of the resource utilization behavior pattern and generation of a measurement response and perform reconfiguration by performing functions of the measurement unit 401, the generation unit 402, and the execution unit 405.

[Application Example Regarding Base Station]

First Application Example

Figure 22:
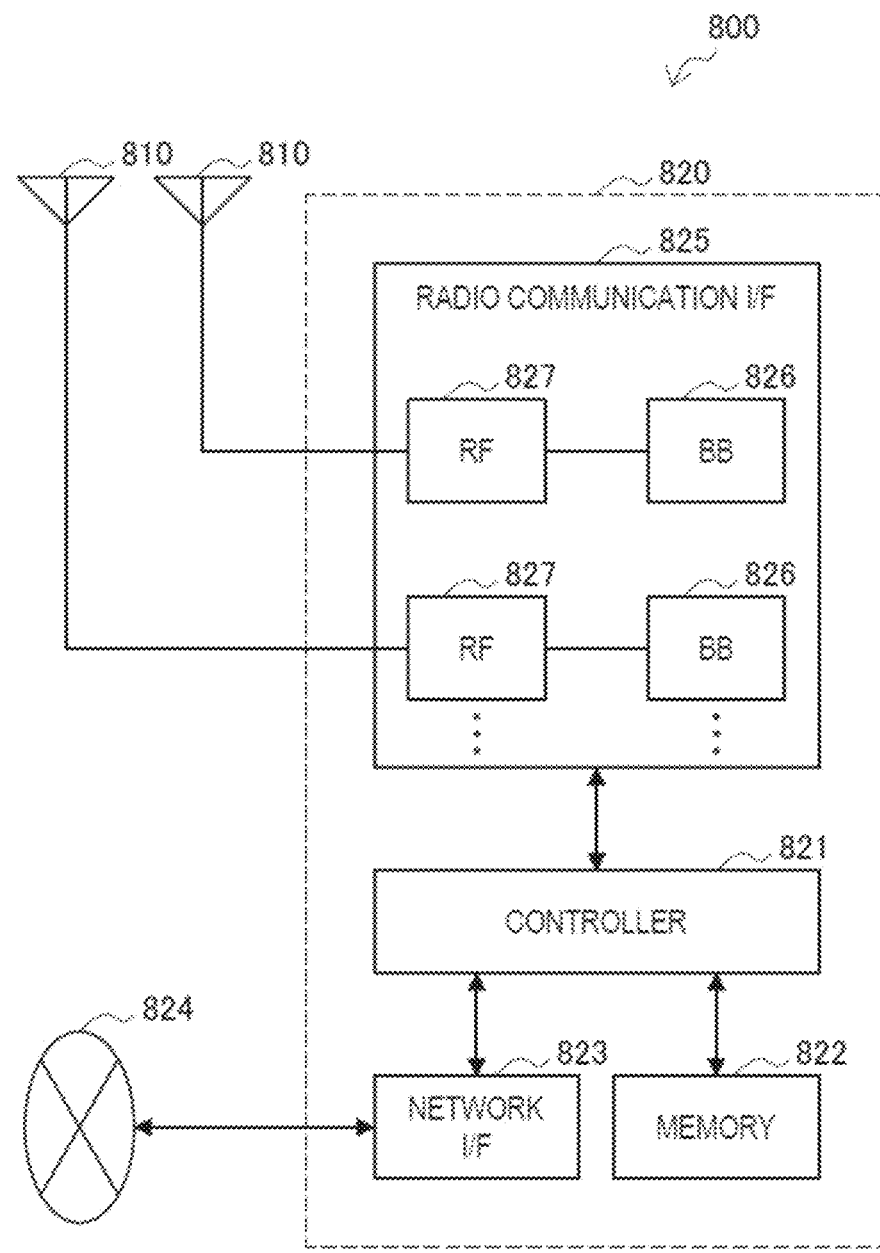
FIG. 22 is a block diagram illustrating a first example of a schematic configuration of an eNB to which the technology of the present disclosure may be applied.

FIG. 22 is a block diagram showing a first example of a schematic configuration of an eNB to which the technology of the present disclosure may be applied. An eNB 800 includes one or more antennas 810 and a base station apparatus 820. The base station apparatus 820 and each of the antennas 810 may be connected to each other via a radio frequency (RF) cable. Each of the antennas 810 includes a single or multiple antenna elements (such as multiple antenna elements included in a multi-input multi-output (MIMO) antenna), and is used for the base station apparatus 820 to transmit and receive wireless signals. As shown in FIG. 22, the eNB 800 may include the multiple antennas 810. For example, the multiple antennas 810 may be compatible with multiple frequency bands used by the eNB 800. Although FIG. 22 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As show in FIG. 22, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 22. For example, the multiple RF circuits 827 may be compatible with multiple antenna elements. Although FIG. 22 shows the example in which the radio communication interface 825 includes the multiple BB processors 826 and the multiple RF circuits 827, the radio communication interface 825 may also include a single BB processor 826 and a single RF circuit 827.

Second Application Example

Figure 23:
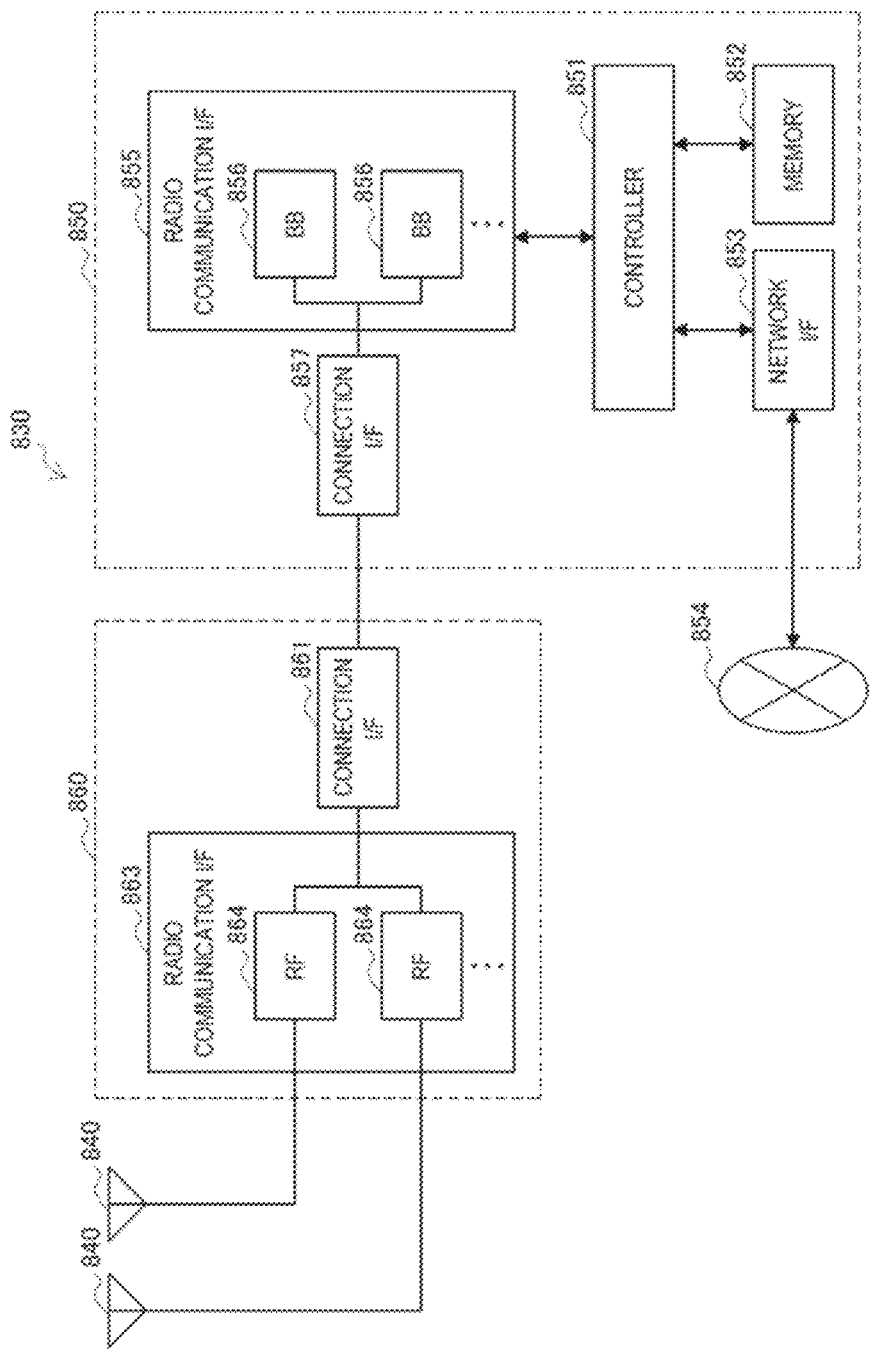
FIG. 23 is a block diagram illustrating a second example of a schematic configuration of an eNB to which the technology of the present disclosure may be applied.

FIG. 23 is a block diagram illustrating a second example of a schematic configuration of an eNB to which the technology of the present disclosure may be applied. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 23, the eNB 830 may include the multiple antennas 840. For example, the multiple antennas 840 may be compatible with multiple frequency bands used by the eNB 830. Although FIG. 23 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 24.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 22, except that the BB processor 856 is connected to an RF circuit 864 of the RRH 860 via the connection interface 857. As show in FIG. 23, the radio communication interface 855 may include the multiple BB processors 856. For example, the multiple BB processors 856 may be compatible with multiple frequency bands used by the eNB 830. Although FIG. 23 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 23. For example, the multiple RF circuits 864 may support multiple antenna elements. Although FIG. 23 shows the example in which the radio communication interface 863 includes the multiple RF circuits 864, the radio communication interface 863 may also include a single RF circuit 864.

In the eNB 800 shown in FIG. 22 and the eNB 830 shown in FIG. 23, the transceiving unit 103 described with reference to FIG. 1, the transceiving unit 203 described with reference to FIG. 6, the transceiving unit 303 described with reference to FIG. 9, and the transceiving unit 404 described with reference to FIG. 10 may be implemented by the radio communication interface 825 and the radio communication interface 855 and/or the radio communication interface 863. At least a part of the functions may be implemented by the controller 821 and the controller 851. The determination unit 101 and the generation unit 102 described with reference to FIG. 1, the determination unit 201 and the allocation unit 202 described with reference to FIG. 6, the acquisition unit 301 described with reference to FIG. 9, and the measurement unit 401, the generation unit 402 and the execution unit 405 described with reference to FIG. 10 may be implemented by the controller 821 and the controller 851. For example, the controller 821 and the controller 851 may perform generation of a measurement request for a resource management object by performing functions of the determination unit 101 and the generation unit 102. The controller 821 and the controller 851 may perform allocation of wireless resources based on resource utilization behavior pattern information by performing functions of the determination unit 201 and the allocation unit 202. The controller 821 and the controller 851 may perform acquisition and update of the resource utilization behavior information of the resource management object by performing a function of the acquisition unit 301. The controller 821 and the controller 851 may perform measurement of the resource utilization behavior pattern and generation of a measurement response and perform reconfiguration by performing functions of the measurement unit 401, the generation unit 402, and the execution unit 405.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2400 shown in FIG. 24) from a storage medium or network, wherein the computer is capable of implementing various functions when installed with various programs.

Figure 24:
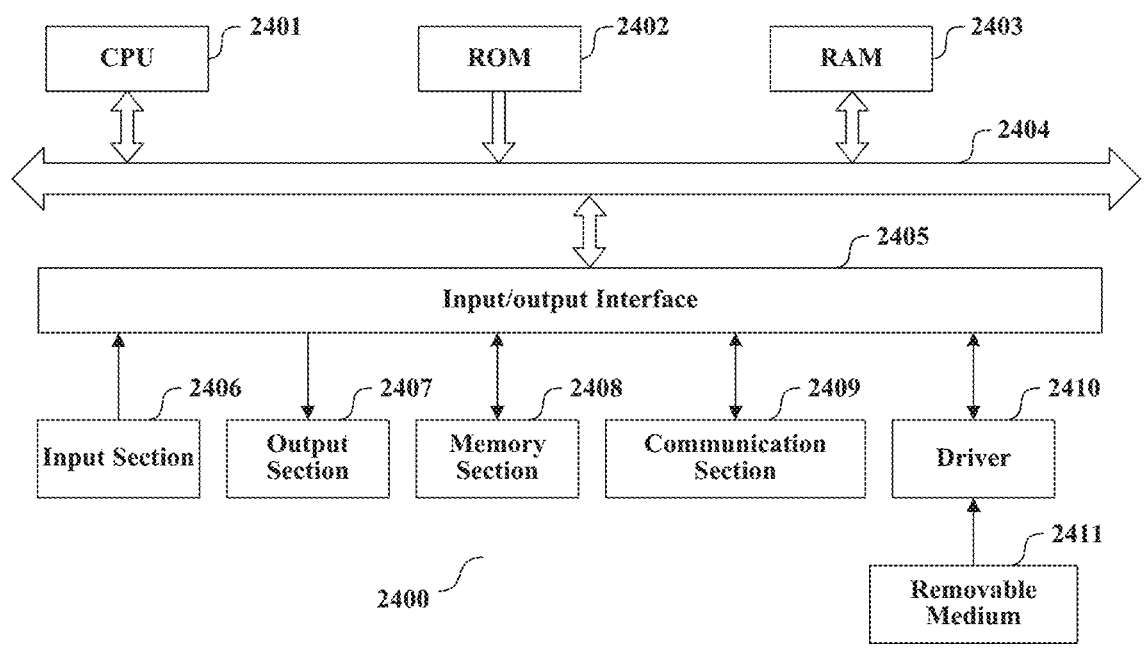
FIG. 24 is a block diagram of an exemplary block diagram illustrating the structure of a general purpose personal computer capable of realizing the method and/or device and/or system according to the embodiments of the present disclosure.

In FIG. 24, a central processing unit (CPU) 2401 executes various processing according to a program stored in a read-only memory (ROM) 2402 or a program loaded to a random access memory (RAM) 2403 from a memory section 2408. The data needed for the various processing of the CPU 2401 may be stored in the RAM 2403 as needed. The CPU 2401, the ROM 2402 and the RAM 2403 are linked with each other via a bus 2404. An input/output interface 2405 is also linked to the bus 2404.

The following components are linked to the input/output interface 2405: an input section 2406 (including keyboard, mouse and the like), an output section 2407 (including displays such as a cathode ray tube (CRT), a liquid crystal display (LCD), a loudspeaker and the like), a memory section 2408 (including hard disc and the like), and a communication section 2409 (including a network interface card such as a LAN card, modem and the like). The communication section 2409 performs communication processing via a network such as the Internet. A driver 2410 may also be linked to the input/output interface 2405, if needed. If needed, a removable medium 2411, for example, a magnetic disc, an optical disc, a magnetic optical disc, a semiconductor memory and the like, may be installed in the driver 2410, so that the computer program read therefrom is installed in the memory section 2408 as appropriate.

In the case where the foregoing series of processing is achieved through software, programs forming the software are installed from a network such as the Internet or a memory medium such as the removable medium 2411.

It should be appreciated by those skilled in the art that the memory medium is not limited to the removable medium 2411 shown in FIG. 24, which has program stored therein and is distributed separately from the apparatus so as to provide the programs to users. The removable medium 2411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2402 and the memory section 2408 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device for a resource management apparatus, comprising:
    a transceiver; and
    processing circuitry operatively connected to the transceiver, configured to:
    receive a resource request from a user equipment;
    in response to the resource request, generate and transmit a measurement request to instruct the user equipment to measure a resource utilization parameter within a specific time range and a specific space range,
    wherein the measurement request comprises at least one of a measurement object, a measurement time window or a measurement region;
    in response to the measurement request, receive a measurement report from the user equipment, the measurement report indicating the requested resource utilization parameter;
    allocate candidate wireless resources to the user equipment and generate corresponding allocation information; and
    transmit the allocation information to the user equipment for selection of actual wireless resources for communication from the candidate wireless resources based on the requested resource utilization parameter.

2. The electronic device of claim 1, wherein the resource utilization parameter indicates a statistical measure for utilization behaviors and utilization results with respect to the wireless resources.

3. The electronic device of claim 1, wherein the resource utilization parameter indicates a distribution of resource utilization events within the specific time range and/or the specific space range.

4. The electronic device according to claim 2,
    wherein the statistical measure comprises:
        a number of events that the UE utilizes the wireless resources within the specific time range and the specific space range, or
        a distribution of intervals between two adjacent events, and
    wherein the events comprise at least one of attempting to perform wireless resource utilization, a successful transmission via the wireless resources, or a failed transmission via the wireless resources.

5. The electronic device according to claim 1, wherein the processing circuitry is further configured to rank, according to respective resource utilization parameters, a plurality of UEs to be allocated, to be used for allocating of the wireless resources to the plurality of UEs.

6. The electronic device according to claim 1, wherein the processing circuitry is further configured to determine expected interferences between a plurality of UEs, and allocate the wireless resources to the plurality of UEs further based on the expected interferences.

7. The electronic device according to claim 6, wherein the processing circuitry is further configured to:
    divide a plurality of UEs into a plurality of management object sets,
        wherein the plurality of UEs in each management object set are capable of sharing the same wireless resources,
        wherein the dividing is performed based on the expected interferences, or the dividing, is performed in accordance with a particular order based on the expected interferences, and
        wherein the particular order is determined based on resource utilization parameters of the plurality of UEs;
    determine, based on the dividing of the management object sets and the resource utilization parameters of the plurality of UEs, the wireless resources usable by the plurality of UEs, respectively; and
    merge, with respect to each wireless resource, the resource utilization parameters of the plurality of UEs which can use the wireless resource, and rank the wireless resources based on a result of the merging, to be used for the allocating of the wireless resources.

8. An electronic device for a user equipment, comprising:
    a transceiver; and
    processing circuitry operatively connected to the transceiver, configured to:
    transmit a resource request to a resource management apparatus;
    in response to the resource request, receive a measurement request to instruct the user equipment to measure a resource utilization parameter within a specific time range and a specific space range,
    wherein the measurement request comprises at least one of a measurement object, a measurement time window or a measurement region;
    in response to the measurement request, perform a measurement and transmit a measurement report to the resource management apparatus, the measurement report indicating the requested resource utilization parameter;
    receive an allocation of candidate wireless resources from the resource management apparatus; and
    select actual wireless resources for communication from the candidate wireless resources based on the requested resource utilization parameter.

9. The electronic device of claim 8, wherein the resource utilization parameter indicates a statistical measure for utilization behaviors and utilization results with respect to the wireless resources.

10. The electronic device of claim 8, wherein the resource utilization parameter indicates a distribution of resource utilization events within the specific time range and/or the specific space range.

11. The electronic device according to claim 8,
wherein the statistical measure comprises:
- a number of events that the UE utilizes the wireless resources within the specific time range and the specific space range, or
- a distribution of intervals between two adjacent events, and wherein the events comprise at least one of attempting to perform wireless resource utilization, a successful transmission via the wireless resources, or a failed transmission via the wireless resources.

12. A method for resource management by an electronic device that includes a transceiver and a processor, the method comprising:
- receiving a resource request from a user equipment;
- in response to the resource request, generating and transmitting a measurement request to instruct the user equipment to measure a resource utilization parameter within a specific time range and a specific space range, wherein the measurement request comprises at least one of a measurement object, a measurement time window or a measurement region;
- in response to the measurement request, receiving a measurement report from the user equipment, the measurement report indicating the requested resource utilization parameter;
- allocating candidate wireless resources to the user equipment and generating corresponding allocation information; and
- transmitting the allocation information to the user equipment for selection of actual wireless resources for communication from the candidate wireless resources based on the requested resource utilization parameter.

\* \* \* \* \*